United States Patent
Kato

(10) Patent No.: US 10,378,183 B2
(45) Date of Patent: Aug. 13, 2019

(54) WORK VEHICLE

(71) Applicant: KOMATSU LTD., Tokyo (JP)

(72) Inventor: Yasunari Kato, Komatsu (JP)

(73) Assignee: KOMATSU LTD., Tokyo (JP)

( * ) Notice: Subject to any disclaimer, the term of this patent is extended or adjusted under 35 U.S.C. 154(b) by 169 days.

(21) Appl. No.: 15/516,709

(22) PCT Filed: Oct. 21, 2016

(86) PCT No.: PCT/JP2016/081338
§ 371 (c)(1),
(2) Date: Apr. 4, 2017

(87) PCT Pub. No.: WO2017/051931
PCT Pub. Date: Mar. 30, 2017

(65) Prior Publication Data
US 2018/0230675 A1    Aug. 16, 2018

(51) Int. Cl.
*E02F 9/16* (2006.01)
*B60P 1/04* (2006.01)
(Continued)

(52) U.S. Cl.
CPC .............. *E02F 9/166* (2013.01); *B60P 1/04* (2013.01); *B60R 7/04* (2013.01); *B62D 33/0625* (2013.01);
(Continued)

(58) Field of Classification Search
CPC ..... B60R 7/04; B60P 1/04; E02F 9/16; A01G 23/00
(Continued)

(56) References Cited

U.S. PATENT DOCUMENTS 4,057,122 A * 11/1977 Brownell ............... B60K 26/00
                                                          180/329
4,140,200 A *  2/1979 Tucek .................... E02F 9/2004
                                                          180/332
(Continued)

FOREIGN PATENT DOCUMENTS

EP       1693522 A2 *  8/2006  ............ E02F 9/2004
FR    2 816 727 A1       5/2002
(Continued)

OTHER PUBLICATIONS

The partial supplemental European search report for the corresponding European application No. 16848719.7 dated Mar. 23, 2018.
(Continued)

*Primary Examiner* — Pinel E Romain
(74) *Attorney, Agent, or Firm* — Global IP Counselors, LLP

(57) ABSTRACT

A wheel loader comprises a console box and a support component. The console box is disposed on the side of an operator's seat and is able to rotate in the forward and backward direction. The support component has a rotary shaft disposed in the left and right direction under the console box, and rotatably supports the console box around the rotary shaft between an operation position in which the console box is disposed horizontally and a retracted position in which the console box is rotated rearward from the operation position and is disposed at an angle. The location of the center of gravity of the console box is disposed more to the front than the rotary shaft at the operation position, and more to the rear than the rotary shaft at the retracted position.

11 Claims, 28 Drawing Sheets

(51) Int. Cl.
  *B66F 9/075* (2006.01)
  *E02D 17/13* (2006.01)
  *B60R 7/04* (2006.01)
  *B62D 33/06* (2006.01)
  *A01B 76/00* (2006.01)
  *A01G 23/00* (2006.01)
  *B60P 1/28* (2006.01)

(52) U.S. Cl.
  CPC ............ *B66F 9/0759* (2013.01); *E02D 17/13* (2013.01); *E02F 9/16* (2013.01); *A01B 76/00* (2013.01); *A01G 23/00* (2013.01); *B60P 1/286* (2013.01); *E01C 2301/30* (2013.01)

(58) Field of Classification Search
  USPC .................................................... 296/190.08
  See application file for complete search history.

(56) References Cited

U.S. PATENT DOCUMENTS

| 4,478,308 | A | * | 10/1984 | Klaassen | ................ | B60K 26/00 |
| | | | | | | 180/326 |
| 7,290,635 | B2 | * | 11/2007 | Bisick | .................... | B60N 2/797 |
| | | | | | | 180/272 |
| 7,823,680 | B2 | * | 11/2010 | Yoon | .................... | B66F 9/0759 |
| | | | | | | 180/271 |
| 9,382,692 | B2 | * | 7/2016 | Sakatani | ................... | E02F 9/16 |

| 2004/0154427 | A1 | | 8/2004 | Jo et al. | |
| 2015/0360593 | A1 | | 12/2015 | Mahler et al. | |
| 2018/0112372 | A1 | * | 4/2018 | Kato ........................ | E02F 9/163 |

FOREIGN PATENT DOCUMENTS

| JP | | 2-47251 U | 3/1990 | | |
| JP | | 9-13425 A | 1/1997 | | |
| JP | | 2002-21120 A | 1/2002 | | |
| JP | | 2002-146839 A | 5/2002 | | |
| JP | | 2004-76386 A | 3/2004 | | |
| JP | | 2004-116048 A | 4/2004 | | |
| JP | | 2005-125837 A | 5/2005 | | |
| JP | | 2005-146639 A | 6/2005 | | |
| JP | | 2010-195515 A | 9/2010 | | |
| JP | | 2011-153427 A | 8/2011 | | |
| JP | | 2012-127137 A | 7/2012 | | |
| WO | WO-2008152860 A1 | * | 12/2008 | ............. | E02F 9/166 |

OTHER PUBLICATIONS

The extended European search report for the corresponding European application No. 16848719.7, dated Jun. 22, 2018.
The International Search Report for the corresponding international application No. PCT/JP2016/081338, dated Nov. 15, 2016.
The Office Action for the corresponding Japanese application No. 2017-507022, dated Dec. 12, 2017.
The Office Action for the corresponding Chinese application No. 201680003099.8, dated Dec. 5, 2018.

* cited by examiner

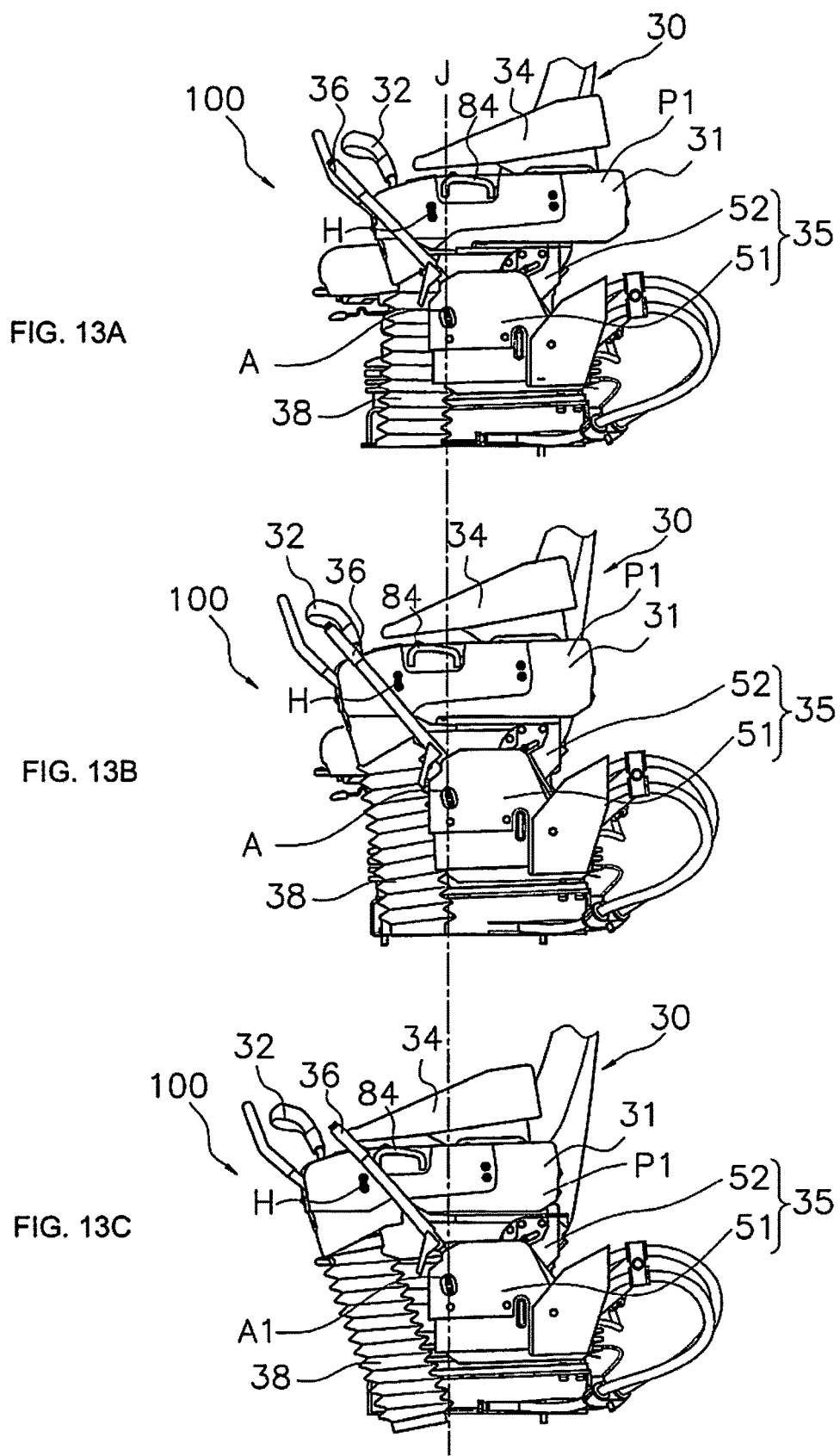

WORK VEHICLE

CROSS-REFERENCE TO RELATED APPLICATIONS

This application is a U.S. National stage application of International Application No. PCT/JP2016/081338, filed on Oct. 21, 2016.

BACKGROUND

Field of the Invention

The present invention relates to a work vehicle.

Description of the Related Art

It has been disclosed that with a wheel loader, a hydraulic excavator, or another such work vehicle, a console box is disposed to the side of the operator's seat, and an operation lever is provided to the console box (see Japanese Laid-Open Patent Application 2012-127137, for example).

With the hydraulic excavator in Japanese Laid-Open Patent Application 2012-127137, in a state in which a gate lock lever is disposed in a blocked position, the console box is located on the front side, and in a state in which the gate lock lever is disposed in an open position, the console box is located on the rear side. The operator goes in and out of the door opening in a state in which the console box is disposed on the rear side.

SUMMARY

However, with the configuration discussed in Japanese Laid-Open Patent Application 2012-127137, although a locking mechanism is provided for locking the position of the console box, it can happen that the operator touches the gate lock lever during operation of the joystick, etc., causing the console box to rotate.

The present invention was conceived in light of the problems encountered with a conventional work vehicle, and it is an object thereof to provide a work vehicle with which the stability of a console box is improved at the position where the console box has been moved in the forward and backward direction.

To achieve the stated object, the work vehicle pertaining to the first invention comprises a console box and a support component. The console box is disposed on the side of the operator's seat and is able to rotate in the forward and backward direction. The support component supports the console box, has a first rotary shaft disposed in the left and right direction below the console box, and allows the console box to rotate around the first rotary shaft between an operation position in which the console box is disposed horizontally and a retracted position in which the console box is rotated rearward from the operation position and is disposed at an angle. The center of gravity location of the console box is disposed more to the front than the first rotary shaft in the operation position, and more to the rear than the first rotary shaft in the retracted position.

Consequently, in a state in which the console box has been disposed in the operation position, for example, even when the operator should accidentally touch the lever that rotates the console box, causing the console box to rotate to the rear, the console box will return to the operation position so long as the operator removes his hand from the lever (if no force is applied to the console box) by the time the center of gravity moves to the rear of the first rotary shaft. Also, in a state in which the console box is disposed in the retracted position, even when the operator should accidentally touch the lever that rotates the console box, causing the console box to rotate forward, the console box will return to the retracted position so long as the operator removes his hand from the lever (if no force is applied to the console box) by the time the center of gravity moves in front of the first rotary shaft.

Also, the console box will return to the operation position under its own weight even when the console box disposed in the operation position is shaken up and down by vibration to which the work vehicle is subjected.

Therefore, the console box can be stably disposed in the operation position or the retracted position.

The work vehicle pertaining to the second invention is the work vehicle pertaining to the first invention, wherein the console box is configured to be able to slide in the forward and backward direction with respect to the support component. The center of gravity position of the console box is disposed more to the front than the first rotary shaft in the operation position in a state in which the console box has been slid to the rear, and more to the rear than the first rotary shaft in the retracted position in a state in which the console box has been slid forward.

Consequently, even when the console box is configured to slide in the forward and backward direction, it can be stably disposed in the operation position or the retracted position.

The work vehicle pertaining to the third invention is the work vehicle pertaining to the first invention, further comprising a biasing component. The biasing component is disposed below the console box and biases the console box in the direction of the operation position. The biasing force of the biasing component is set so that the rotational moment produced in the console box by the biasing force of the biasing component in the retracted position is less than the rotational moment produced by the weight of the console box.

Consequently, the console box can be more stably disposed in the operation position by means of the biasing force of the biasing component. Also, in the retracted position, the biasing force on the console box to the operation position is weak, so the console box is stably disposed in the retracted position by its own weight.

Thus, providing a biasing component allows for adjustment of the switching position between the position where the console box returns to the operation position and the position where the console box returns to the retracted position, in a state in which the operator is exerting no force at the console box rotation position.

For example, when the biasing force produced by the biasing component is increased, it can be set that the console box returns to the operation position even at a position in which the center of gravity is more to the rear than the first rotary shaft.

The work vehicle pertaining to the fourth invention is the work vehicle pertaining to the first invention, further comprising a biasing component. The biasing component is disposed below the console box and biases the console box in the direction of the operation position. The biasing component biases in the direction of expansion in its lengthwise direction. The support component has a rotary frame and a fixed frame. The rotary frame is disposed below the console box and rotates along with the console box. The fixed frame is disposed below the rotary frame and rotatably supports the rotary frame. The biasing component has a first end that links to the rotary frame to the rear of the first rotary shaft, and a second end that links to the fixed frame to the rear of the first end.

Consequently, the console box can be more stably disposed in the operation position by means of the biasing force produced by the biasing component. Also, in the retracted position the biasing force on the console box to the operation position is weak, so the console box can be stably disposed in the retracted position by its own weight.

Thus, providing the biasing component allows for adjustment of the switching position between the position where the console box returns to the operation position and the position where the console box returns to the retracted position, in a state in which the operator is exerting no force at the console box rotation position.

Also, even with a configuration in which the console box is able to slide, the biasing of the console box by the biasing component can be carried out stably by linking the biasing component to the rotary frame that does not slide.

The work vehicle pertaining to the fifth invention is the work vehicle pertaining to the first invention, further comprising an operation position locking mechanism that releasably locks the console box in the operation position.

Consequently, the console box can be fixed in the operation position, thus affording stability. Also, even when the fixing should be lost through vibration or improper operation, since the center of gravity position of the console box is disposed more to the front than the first rotary shaft, the console box can return to the operation position under its own weight, thus affording twice the stability.

The work vehicle pertaining to the sixth invention is the work vehicle pertaining to the fifth invention, further comprising a rotary lever configured to be grasped by the operator when the console box is rotated in the forward and backward direction. The support component has a rotary frame and a fixed frame. The rotary frame is disposed below the console box and rotates along with the console box. The fixed frame is disposed below the rotary frame and rotatably supports the rotary frame. The rotary lever is rotatably attached to the rotary frame around a second rotary shaft provided at a different position from the position of the first rotary shaft. The operation position locking mechanism has a first latching member and a locking component. The first latching member is disposed on the fixed frame. The locking component is disposed on the rotary frame and is latched by the latching member in the locked state at the operation position. The latching of the locking component to the latching member is released as the rotary lever rotates rearward.

Consequently, locking can be released at the operation position along with the operation to rotate the console box in the forward and backward direction.

The work vehicle pertaining to the seventh invention is the work vehicle pertaining to the sixth invention, wherein the rotary frame has a contacted component that is hit by the rotary lever when the rotary lever rotates rearward by a specific angle after the latching is released. The rotary frame rotates rearward along with the rotary lever after the rotary lever hits the contacted component.

Consequently, play can be provided to the operation of the rotary lever by the time the console box rotates after the locking is released at the operation position. This play prevents the rotation of the console box from starting at the same time as the unlocking, thus affording stability.

The work vehicle pertaining to the eighth invention is the work vehicle pertaining to the first invention, further comprising a retracted position locking mechanism that releasably locks the console box in the retracted position.

Consequently, the console box can be fixed in the retracted position, thus affording stability. Also, even when the fixing should be lost through vibration or improper operation, since the center of gravity position of the console box is disposed more to the rear than the first rotary shaft, the console box can return to the retracted position under its own weight, thus affording twice the stability.

The work vehicle pertaining to the ninth invention is the work vehicle pertaining to the eighth invention, further comprising a rotary lever configured to be grasped by the operator when the console box is rotated in the forward and backward direction. The support component has a rotary frame and a fixed frame. The rotary frame is disposed below the console box and rotates along with the console box. The fixed frame is disposed below the rotary frame and rotatably supports the rotary frame. The rotary lever is attached to the rotary frame. The retracted position locking mechanism has a restricting member and a locking member. The restricting member is disposed on the fixed frame. The locking member is disposed rotatably on the rotary frame and its forward rotation is restricted by the restricting member in the state of being locked at the retracted position. The rotary lever has a cylindrical grip configured to be grasped by the operator, and a post-shaped insertion member that is inserted into the grip. The insertion member has a push button that is formed at one end and protrudes from the distal end of the grip, and the other end is linked to the locking member at a linked part. The locking member is rotated by depressing the push button, thereby releasing the restriction by the restricting member.

Consequently, the operator can unlock the console box in the retracted position by grasping the rotary lever and pressing the push button. The grasped rotary lever can then be rotated forward to move the console box from the retracted position to the operation position.

The work vehicle pertaining to the tenth invention is the work vehicle pertaining to the ninth invention, wherein the locking member is formed so as to rotate rearward under its own weight and around a third rotary shaft. The locking member has a contact face and an interference face. The contact face is configured to come into contact with the restricting member under its own weight at the retracted position. The interference face is formed in an arc whose center is the third rotary shaft, and is disposed under the restricting member in a state in which the contact face is in contact with the restricting member. The interference face interferes with the restricting member when the console box has been rotated forward in a state in which the push button is not being depressed. The locking member rotates forward around the third rotary shaft and the interference face moves away from under the restricting member when the push button is depressed.

Consequently, in the retracted position the locking member can lock the rotation of the console box under its own weight, resulting in excellent stability.

The present invention provides a work vehicle with which the stability of a console box is improved at positions where the console box has been moved in the forward and backward direction.

BRIEF DESCRIPTION OF DRAWINGS

FIGS. 13A to 13C are side views illustrating the center of gravity position in the operation position when the console box in FIG. 3 has been slid;

DETAILED DESCRIPTION OF EXEMPLARY EMBODIMENTS

The wheel loader in an exemplary embodiment pertaining to the present invention will now be described through reference to the drawings.

1. Configuration 1-1. Overview of Wheel Loader Configuration

Figure 1:
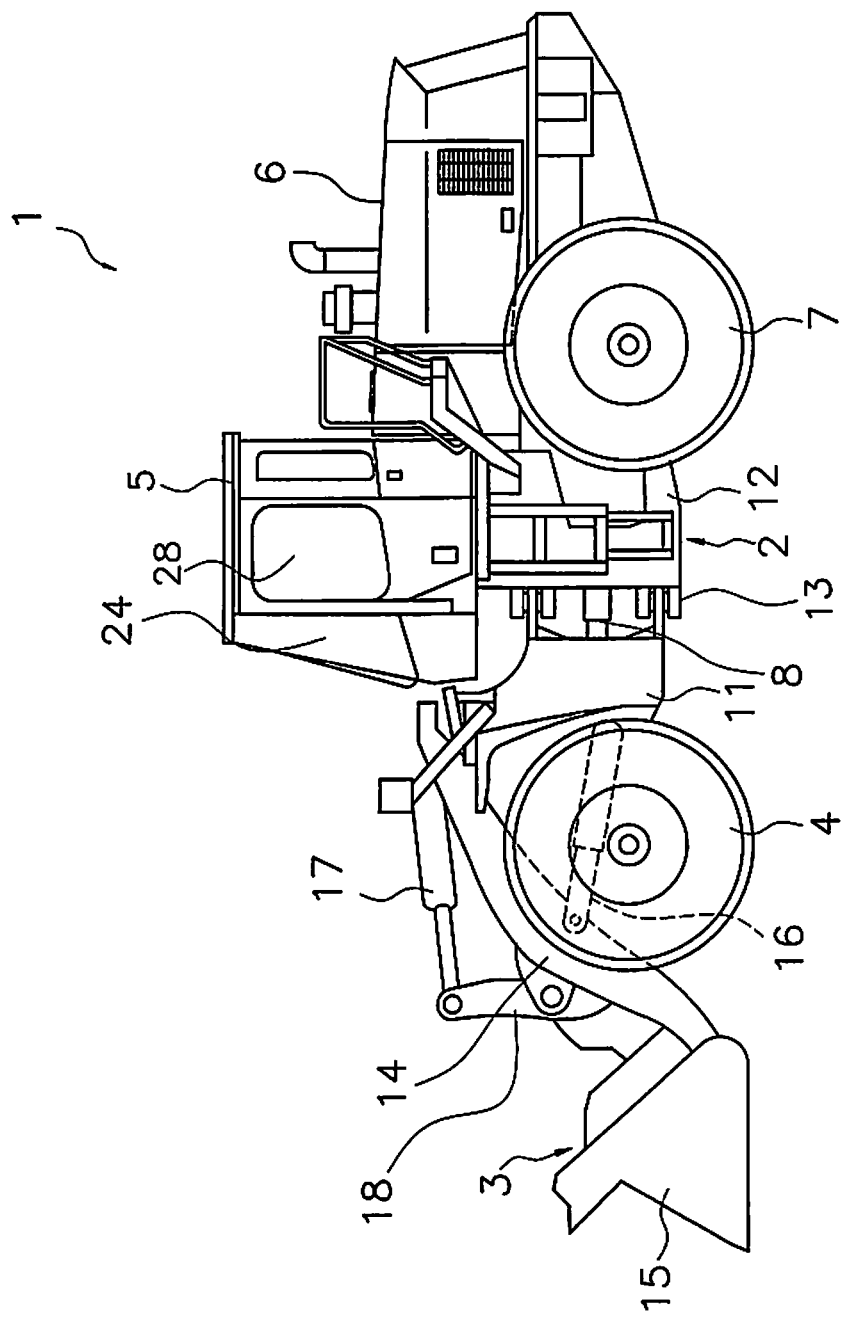
FIG. 1 is a side view of a wheel loader in an exemplary embodiment pertaining to the present invention.

FIG. 1 is a simplified view of the configuration of a wheel loader 1 in this exemplary embodiment. The wheel loader 1 in this exemplary embodiment mainly comprises a body frame 2, a work implement 3, a pair of front tires 4, a cab 5, an engine compartment 6, a pair of rear tires 7, and a pair of steering cylinders 8.

In this exemplary embodiment, the forward, rearward, left, and right directions refer to those directions as seen by an operator sitting in an operator's seat 30 (discussed below) inside the cab 5.

The wheel loader 1 uses the work implement 3 to perform work, such as scooping up soil.

The body frame 2 is an articulated type, and has a front frame 11, a rear frame 12, and a linking shaft 13. The front frame 11 is disposed ahead of the rear frame 12. The linking shaft 13 is provided in the middle in the vehicle width direction, and links the front frame 11 and the rear frame 12 so that the front frame 11 and the rear frame 12 can pivot with respect to each other. The front tires 4 are attached on the left and right sides of the front frame 11. The rear tires 7 are attached on the left and right sides of the rear frame 12.

The work implement 3 is driven by hydraulic fluid from a work implement pump (not shown). The work implement 3 has a boom 14, a bucket 15, a lift cylinder 16, and a bucket cylinder 17. The boom 14 is mounted to the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The extension and retraction of the lift cylinder 16 causes the boom 14 to pivot up and down. One end of the bucket cylinder 17 is attached to the front frame 11, and the other end of the bucket cylinder 17 is attached to the bucket 15 via a bell crank 18. The extension and retraction of the bucket cylinder 17 causes the bucket 15 to pivot up and down.

The steering cylinders 8 are disposed on the left and right sides in the vehicle width direction of the linking shaft 13, and are each attached to the front frame 11 and the rear frame 12. The amount of fluid supplied to the steering cylinders 8 is varied to change the steering angle of the front frame 11 with respect to the rear frame 12, and thereby change the travel direction of the wheel loader 1.

The cab 5 rests on top of the rear frame 12, and in its interior are disposed a steering wheel 37 or joystick 32 (see FIG. 2; discussed below) used for steering operation, levers for controlling the work implement 3, various kinds of display device, and so forth. The engine compartment 6 is disposed on the rear frame 12 and to the rear of the cab 5, and houses an engine.

1-2. Cab Configuration

Figure 2:
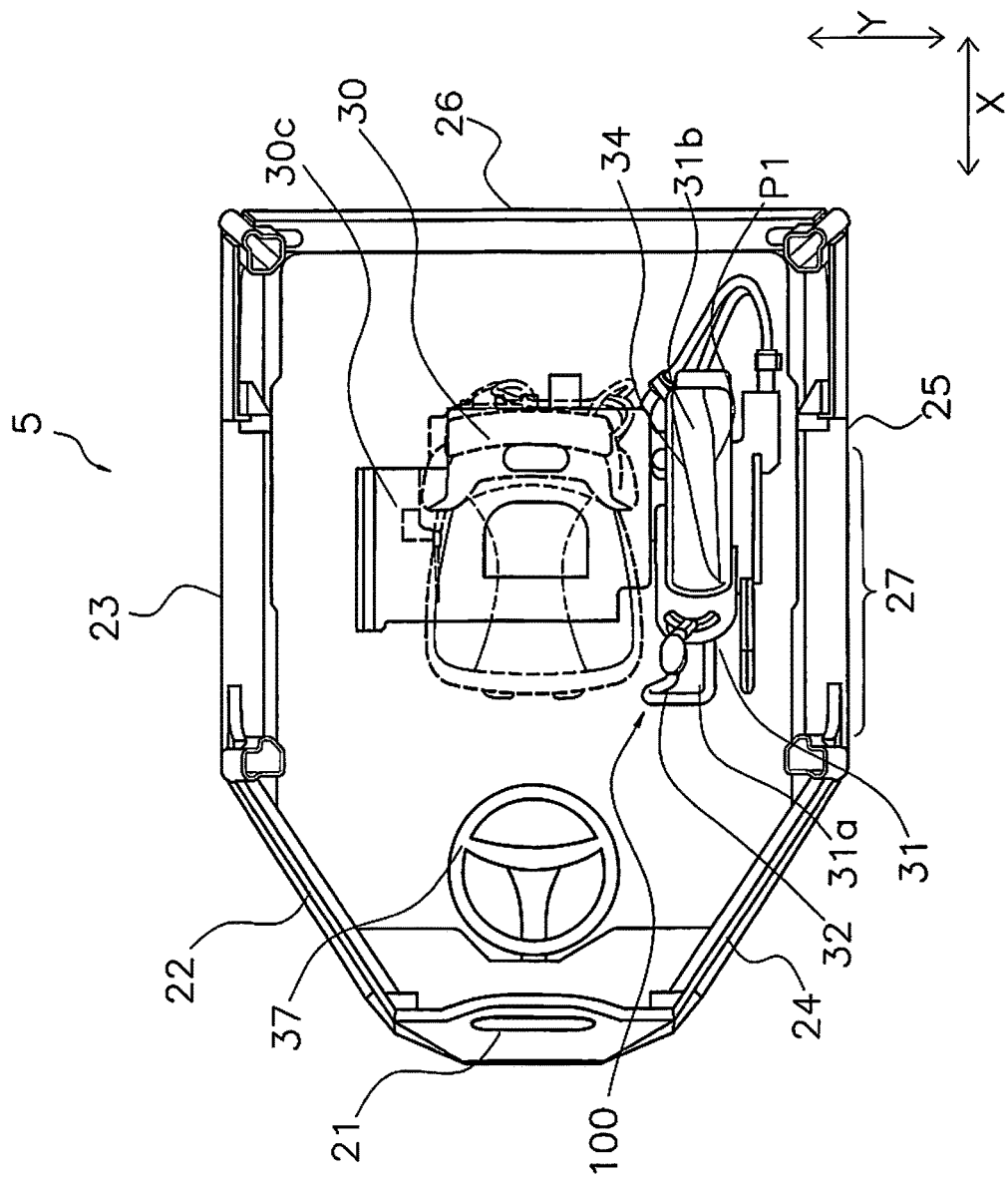
FIG. 2 is a top view of the configuration inside the cab in FIG. 1 in a state in which the console box is disposed in the operation position.
Figure 3:
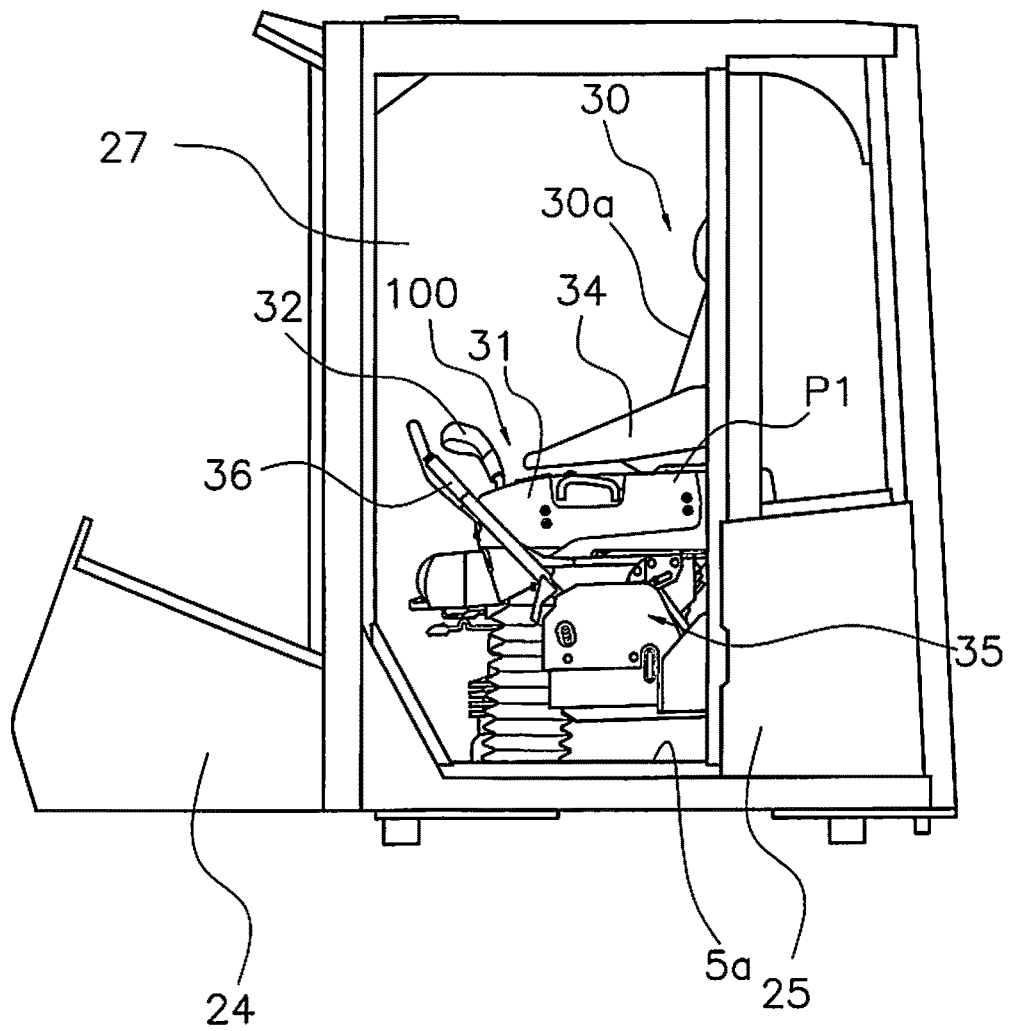
FIG. 3 is a left side view of the configuration of the cab in FIG. 1 in a state in which the console box is disposed in the operation position.

FIG. 2 is a top view of the cab 5. FIG. 3 is a partial side view of the cab 5. As shown in FIG. 2, in top view the cab 5 is substantially hexagonal, and has a front face 21, a right angled face 22, a right side face 23, a left angled face 24, a left side face 25, and a rear face 26. The front face 21 and the rear face 26 are parallel to each other, and are each disposed in the left and right direction (see the arrow Y in FIG. 2). The right side face 23 is disposed facing forward from the right end of the rear face 26. The right angled face 22 is disposed at an angle to the forward and backward direction (see the arrow X in FIG. 2), and is provided between the front end of the right side face 23 and the right end of the front face 21. The left side face 25 is disposed facing forward from the left end of the rear face 26. The left angled face 24 is at an angle to the forward and backward direction, and is provided between the front end of the left side face 25 and the left end of the front face 21. The right angled face 22 and the left angled face 24 are disposed such that the distance between them narrows moving forward. The right angled face 22 and the left angled face 24 are disposed at an angle to the forward and backward direction in order to avoid interference with the front frame during steering operations.

A door opening 27 is located at a position ahead of the left side face 25, and the door 28 shown in FIG. 1 is provided to this door opening 27.

1-3. Internal Configuration of Cab

Figure 4:
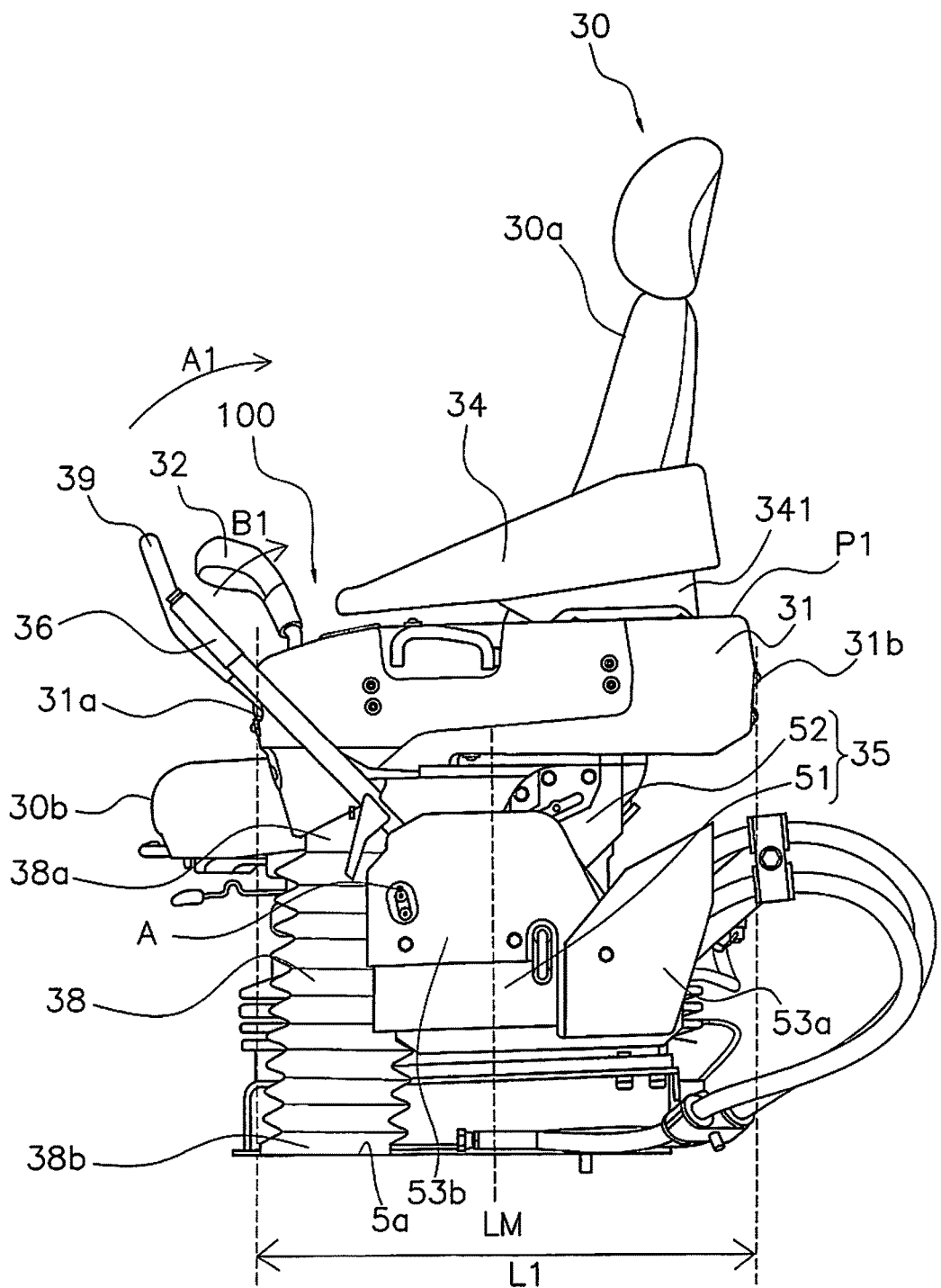
FIG. 4 is a side view of the operator's seat in FIG. 3 and of the console box assembly in a state in which the console box is disposed in the operation position.

FIG. 4 shows the state when the left side face 25 has been removed in FIG. 3.

The operator's seat 30, a console box assembly 100, the steering wheel 37 (see FIG. 2), and so forth are provided inside the cab 5. The console box assembly 100 is disposed on the left side of the operator's seat 30, has the joystick 32 and so forth, and is used by the operator to perform steering operations.

1-4. Operator's Seat, Steering Wheel

As shown in FIG. 2, the operator's seat 30 is disposed in the approximate center between the right side face 23 and the left side face 25. The operator's seat 30 is disposed at a position that is more or less opposite the door opening 27. As shown in FIG. 4, the operator's seat 30 has a backrest 30a, a seat bottom 30b, a lower frame 30c (see FIG. 7; discussed below) that is under the seat bottom 30b, and so on, and a spring (not shown) is disposed under the lower frame 30c.

The steering wheel 37 is used by the operator to change the steering angle of the front frame 11 with respect to the rear frame 12 during movement, etc. As shown in FIG. 2, the steering wheel 37 is disposed ahead of the operator's seat 30 and is disposed between the right angled face 22 and the left angled face 24.

1-5. Console Box Assembly

The console box assembly 100 has a joystick 32 that is used by the operator during steering operations, a console box 31 that supports the joystick 32, and so forth.

The console box assembly 100 has the console box 31 (see FIG. 4), the joystick 32 (see FIG. 4), a link 33 (see FIG. 5; discussed below), an armrest 34 (see FIG. 4), a support component 35 (see FIG. 4), a rotary lever 36 (see FIG. 4), a bellows 38 (see FIG. 4), a gas spring 110 (see FIG. 5; discussed below), an operation position stopper 111 (see FIG. 5; discussed below), a retracted position stopper 112 (see FIG. 18; discussed below), an operation position locking mechanism 113 (see FIG. 19; discussed below), a retracted position locking mechanism 114 (see FIG. 25; discussed below), and so forth.

1-5-1. Console Box

The console box 31 is disposed on the left side of the operator's seat 30. The console box 31 could also be said to be disposed between the operator's seat 30 and the door opening 27. As shown in FIG. 4, the console box 31 is disposed substantially horizontally, and is formed longer in the forward and backward direction. Parts of the joystick 32 and the link 33, etc. (discussed below), are provided inside the console box 31. As shown in FIG. 4, the position of the console box 31, which is disposed substantially horizontally, is the operation position P1. The operation position P1 is the position of the console box 31 when the operator sits in the operator's seat 30 and operates the joystick 32.

The internal configuration of the console box 31 will be discussed in detail below, but the console box 31 is able to slide in the forward and backward direction, and in FIG. 4 is disposed at the rear end.

1-5-2. Joystick

As shown in FIG. 4, the joystick 32 is provided so as to protrude upward on the upper side near the front end 31a of the console box 31.

The joystick 32 is used to scoop up and transport soil and in other such jobs. The steering angle of the front frame 11 with respect to the rear frame 12 is changed by rotating the joystick 32 in the left and right direction. A guard member 39 that guards the joystick 32 is provided to the front end 31a of the console box 31.

1-5-3. Bellows 38

The bellows 38 is disposed between the floor 5a and the lower side of the console box 31 near the front end 31a. The lower end 38b of the bellows 38 is fixed to the floor 5a, and the upper end 38a is linked to the console box 31.

The bellows 38 covers the area around the link 33, which links the joystick 32 to a pilot valve 19 (discussed below).

1-5-4. Link

Figure 5:
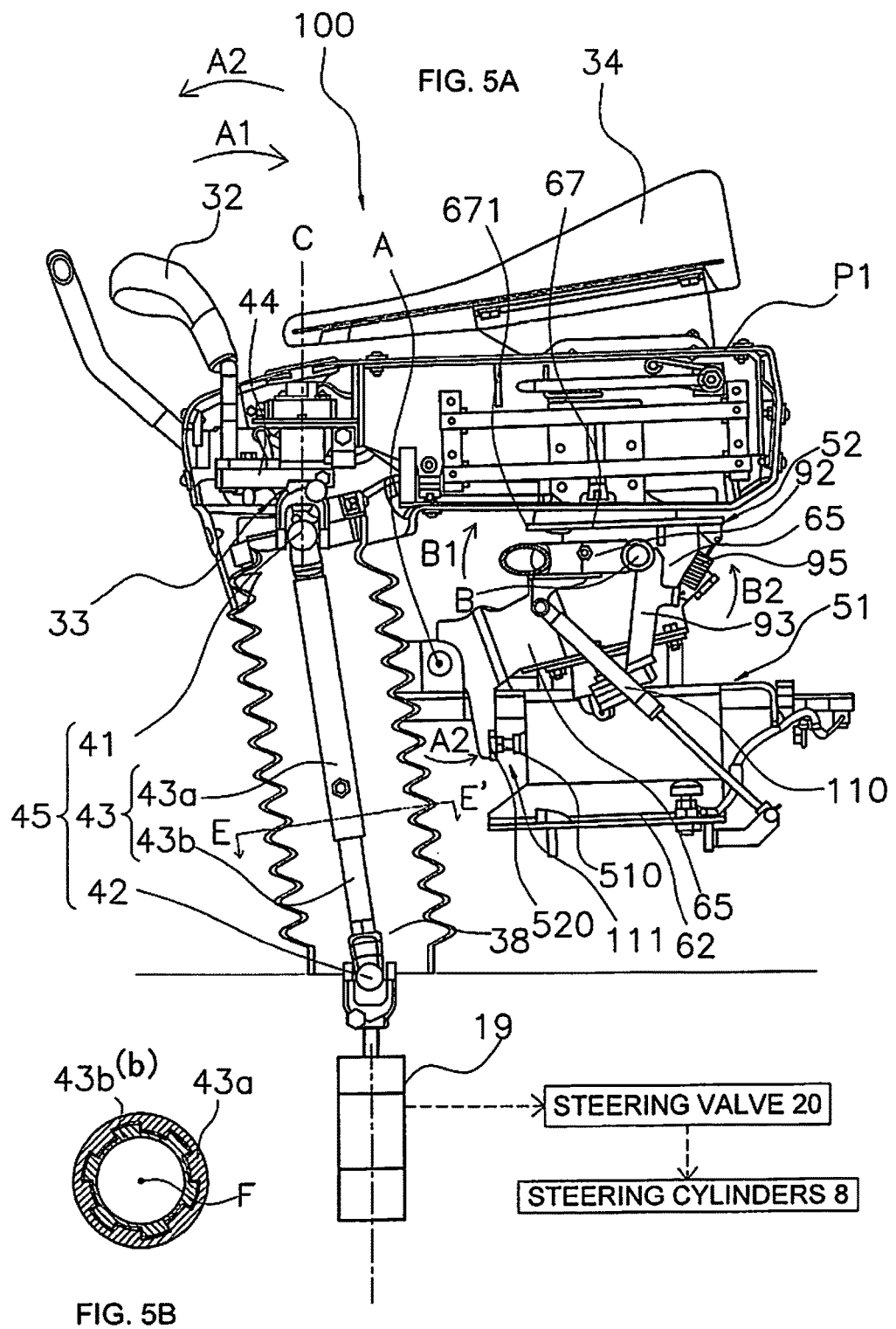
FIG. 5A shows the cross sectional configuration of FIG. 4.
FIG. 5B is a cross section along the E-E' line in FIG. 5A.
Figure 6:
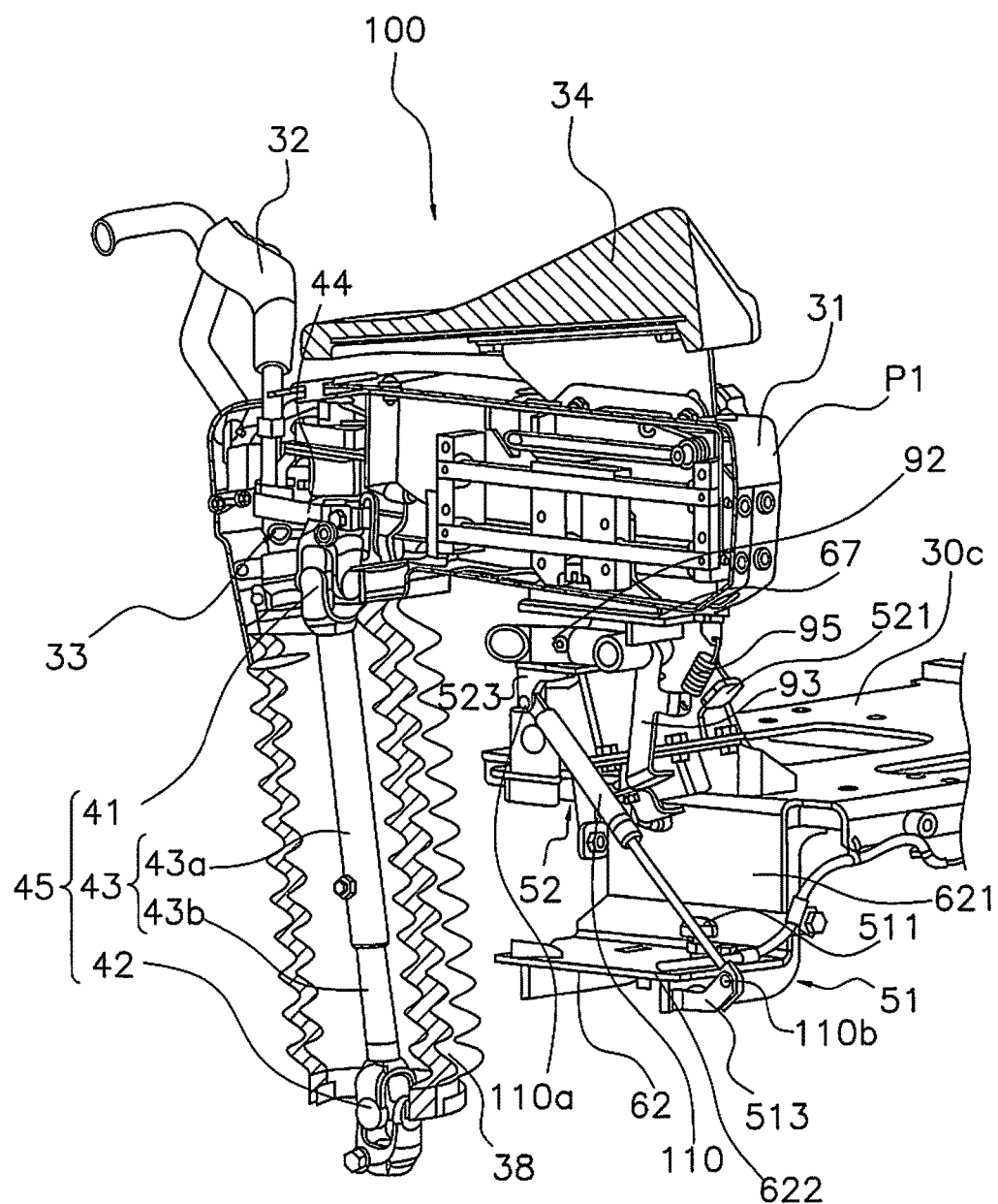
FIG. 6 is an oblique view of FIG. 5A.

FIG. 5A is a cross section of the console box assembly 100, and shows the interior of the bellows 38. FIG. 6 is an oblique view of FIG. 5A.

The link 33 links the joystick 32 to the pilot valve 19. The link 33 mainly has a linking bar 44 and a universal joint 45.

The linking bar 44 is disposed in the forward and backward direction, and links the joystick 32 to the universal joint 45. The joystick 32 is disposed facing upward at the upper end of the linking bar 44. The universal joint 45 is attached facing downward on the lower side of the rear end of the linking bar 44. The linking bar 44 is supported by the console box 31 so as to be able to rotate in the left and right direction around the axis C, which is the up and down direction, of the rear end to which the universal joint 45 is attached.

As shown in FIG. 5A, the universal joint 45 has a first joint 41, a second joint 42, and a telescoping part 43. The first joint 41 and the second joint 42 are disposed at both ends of the telescoping part 43. The telescoping part 43 is made up of an outer tube 43a and an inner tube 43b, and the outer tube 43a and the inner tube 43b are spline engaged.

FIG. 5B is a cross section along the E-E' line in FIG. 5A. As shown in FIG. 5B, a serrated groove is formed around the inside of the outer tube 43a, and a serrated groove that meshes with the serrated groove of the outer tube 43a is formed around the outside of the inner tube 43b. These grooves are formed in the lengthwise direction. This configuration causes the outer tube 43a and the inner tube 43b to be fixed to each other around the center axis F, allowing the operation of the joystick 32 to be transmitted. Also, the outer tube 43a and the inner tube 43b can move along the center axis F, which allow the telescoping part 43 to expand and contract.

The first joint 41 is attached on the lower side of the console box 31, and is linked by the linking bar 44 to the joystick 32. The second joint 42 is attached by being inserted into the floor 5a of the cab 5.

The second joint 42 of the link 33 is connected to the pilot valve 19. The operation of the joystick 32 is transmitted through the link 33 to the pilot valve 19, thus adjusting the pilot pressure inputted to a steering valve 20. The steering valve 20 adjusts the flow of fluid supplied to the steering cylinders 8 according to the inputted pilot pressure. Thus, steering operations can be performed by operating the joystick 32.

1-5-5. Armrest

As shown in FIG. 4, the armrest 34 is disposed on the upper side of the console box 31 via a bracket 341. In a state in which the console box 31 is disposed in the operation position P1, the armrest 34 is used to rest the arm of the operator sitting in the operator's seat 30.

1-5-6. Support Component

Figure 7:
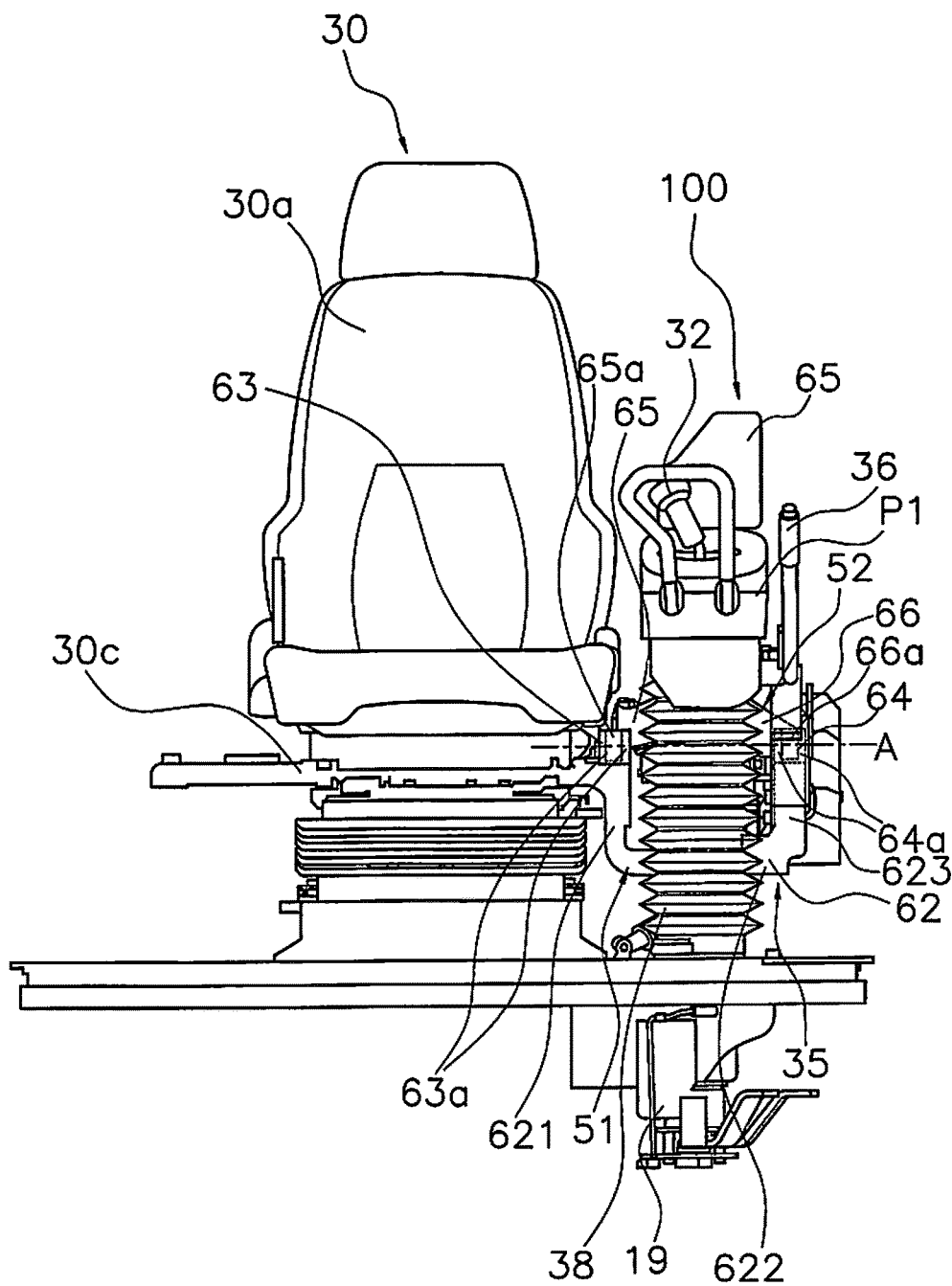
FIG. 7 is a front view of the operator's seat and the console box assembly in FIG. 4.
Figure 8:
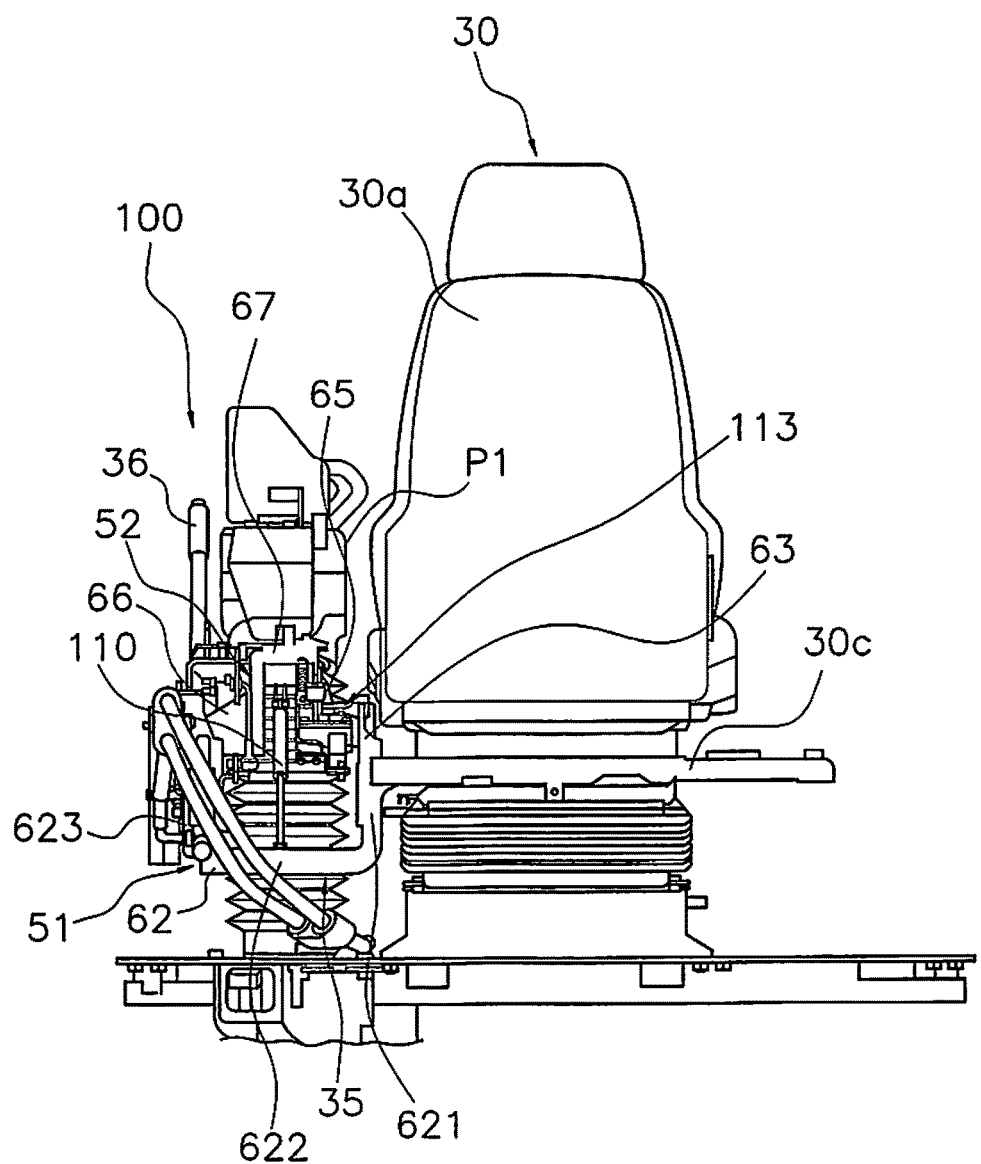
FIG. 8 is a rear view of the operator's seat and the console box assembly in FIG. 4.

FIG. 7 shows the area near the operator's seat 30 as seen from the front side. FIG. 8 shows the area near the operator's seat 30 as seen from the rear side.

As shown in FIGS. 4, 7, and 8, the support component 35 mainly has a fixed frame 51 and a rotary frame 52. The fixed frame 51 is fixed to the operator's seat 30. The rotary frame 52 is disposed on the upper side of the fixed frame 51, and is rotatably supported by the fixed frame 51. The rotary frame 52 slidably supports the console box 31.

a. Fixed Frame

As shown in FIG. 4, the fixed frame 51 is disposed on the rear side of the bellows 38 and below the console box 31. As shown in FIGS. 7 and 8, the fixed frame 51 is provided protruding toward the left side face from the lower frame 30c of the operator's seat 30.

As shown in FIG. 7, the fixed frame 51 has a fixed component 62, a first shaft support component 63, and a second shaft support component 64.

The fixed component 62 is connected to the lower frame 30c. The lower frame 30c protrudes to the left from the operator's seat 30, and the fixed component 62 is fixed to the left end of the lower frame 30c. The fixed component 62 is substantially U shaped when viewed in the forward and backward direction, and has a right side face 621, a bottom face 622, and a left side face 623.

The first shaft support component 63 is fixed to the right side face 621 of the fixed component 62. The second shaft support component 64 is fixed to the left side face 623 of the fixed component 62. The second shaft support component 64 is provided at a location opposite the first shaft support component 63 in the left and right direction. The first shaft support component 63 and the second shaft support component 64 rotatably support the rotary frame 52.

The first shaft support component 63 has two flat parts 63a disposed opposite each other with a specific space in between them in the left and right direction. A hole is formed in the left and right direction in each of the two flat parts 63a. A shaft that is fixed to the lower end 65a of a first rotary part 65 (discussed below) is inserted into these holes so that the first shaft support component 63 rotatably supports the first rotary part 65.

The second shaft support component 64 is fixed to the left side face 623 of the fixed component 62. The second shaft support component 64 has two flat parts 64a disposed opposite each other with a specific space in between them in the left and right direction. A hole is formed in the left and right direction in each of the two flat parts 64a. A shaft that is fixed to the lower end 66a of a second rotary part 66 (discussed below) is inserted into these holes so that the second shaft support component 64 rotatably supports the second rotary part 66.

b. Rotary Frame

The rotary frame 52 mainly has the first rotary part 65, the second rotary part 66, and a third rotary part 67 (see FIG. 8). The first rotary part 65 and the second rotary part 66 are disposed so as to be opposite and aligned in the left and right direction between the console box 31 and the fixed frame 51. The first rotary part 65 is disposed on the right side face 621 side, while the second rotary part 66 is disposed on the left side face 623 side. The first rotary part 65 and the second rotary part 66 are formed by being bent so that the space between them is substantially wider at the lower end than at the upper end.

The first rotary part 65 and the second rotary part 66 are linked at their upper ends to the third rotary part 67. The lower end 65a of the first rotary part 65 is inserted between the two flat parts 63a of the first shaft support component 63, and the shaft provided to the lower end 65a as discussed above is inserted into the holes in the flat parts 63a. The lower end 66a of the second rotary part 66 is inserted into the two flat parts 64a of the second shaft support component 64, and the shaft provided to the lower end 66a as discussed above is inserted into the holes in the flat parts 64a.

The shaft provided to the lower end 65a and the shaft provided to the lower end 66a are disposed coaxially (rotary shaft A) in the left and right direction.

The first rotary part 65 and the second rotary part 66 are able to rotate with respect to the fixed frame 51, around the rotary shaft A.

As shown in FIG. 8, the third rotary part 67 is linked to the upper end of the first rotary part 65 and to the upper end of the second rotary part 66, and slidably supports the console box 31. Therefore, the rotation of the first rotary part 65 and the second rotary part 66 causes the console box 31 to rotate as well.

The rotary shaft A of the console box 31 is the center of a first shaft 53 and a second shaft 54, and is shown in FIG. 4, FIG. 7, etc. As shown in FIG. 4, this rotary shaft A is on the lower side of the console box 31, and is disposed more to the front than the middle (see the line LM) of L 1 between the front end 31a and the rear end 31b of the console box 31.

In the operation position P1, the console box 31 is substantially the same height as its front end 31a and rear end 31b, and is disposed substantially horizontally, as shown in FIG. 4.

Figure 9:
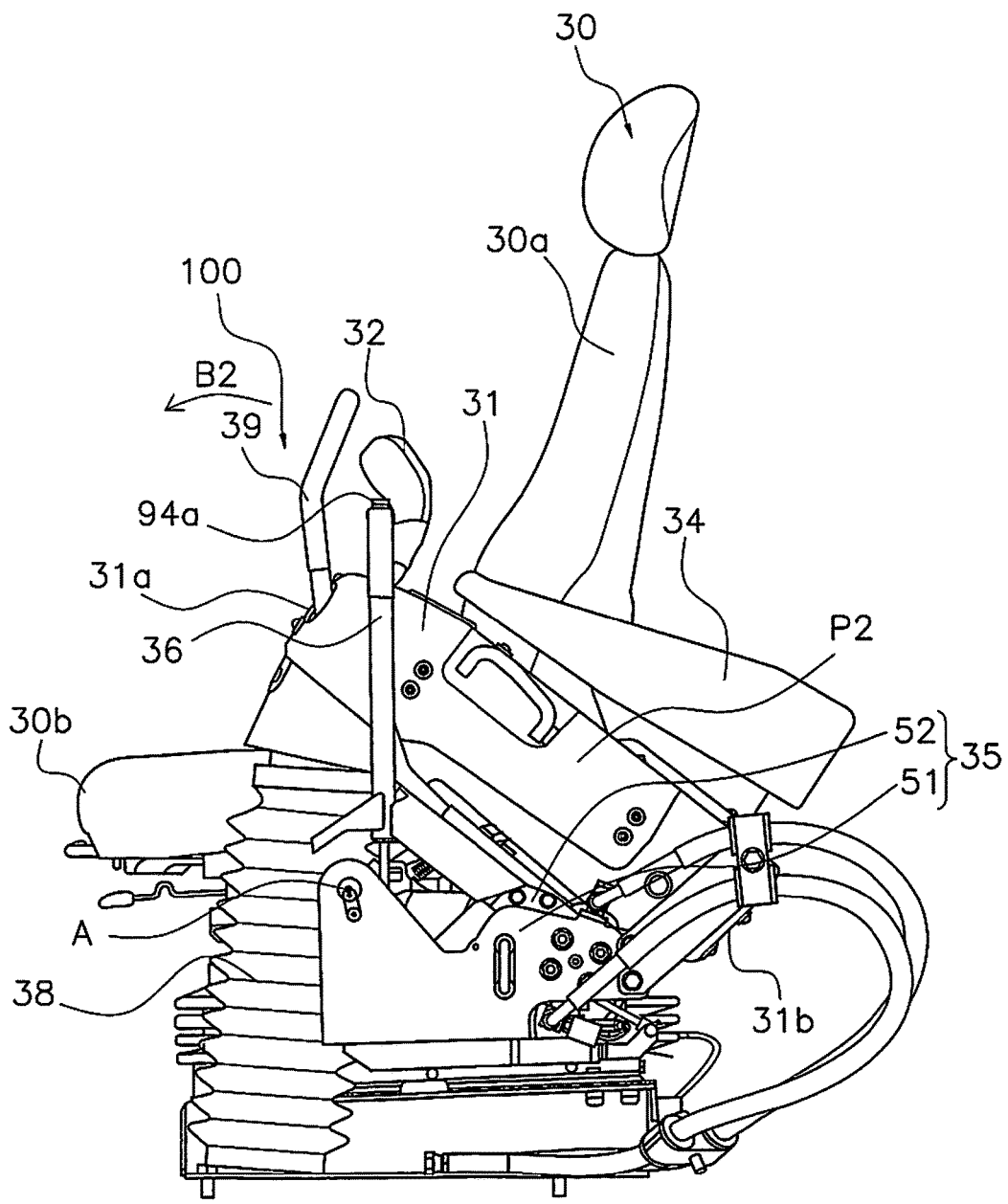
FIG. 9 is a side view of the operator's seat in FIG. 3 and the console box assembly in a state in which the console box is disposed in the retracted position.

FIG. 9 is a side view of the console box assembly 100 when the console box 31 is disposed in a retracted position P2. When the operator grasps the rotary lever 36 (discussed below) in a state in which the console box 31 is disposed in the operation position P1 as in FIG. 4, and rotates the rotary lever 36 rearward as indicated by the arrow A1 in FIG. 4, the console box 31 rotates around the rotary shaft A until the console box 31 is disposed in the retracted position P2.

Figure 10:
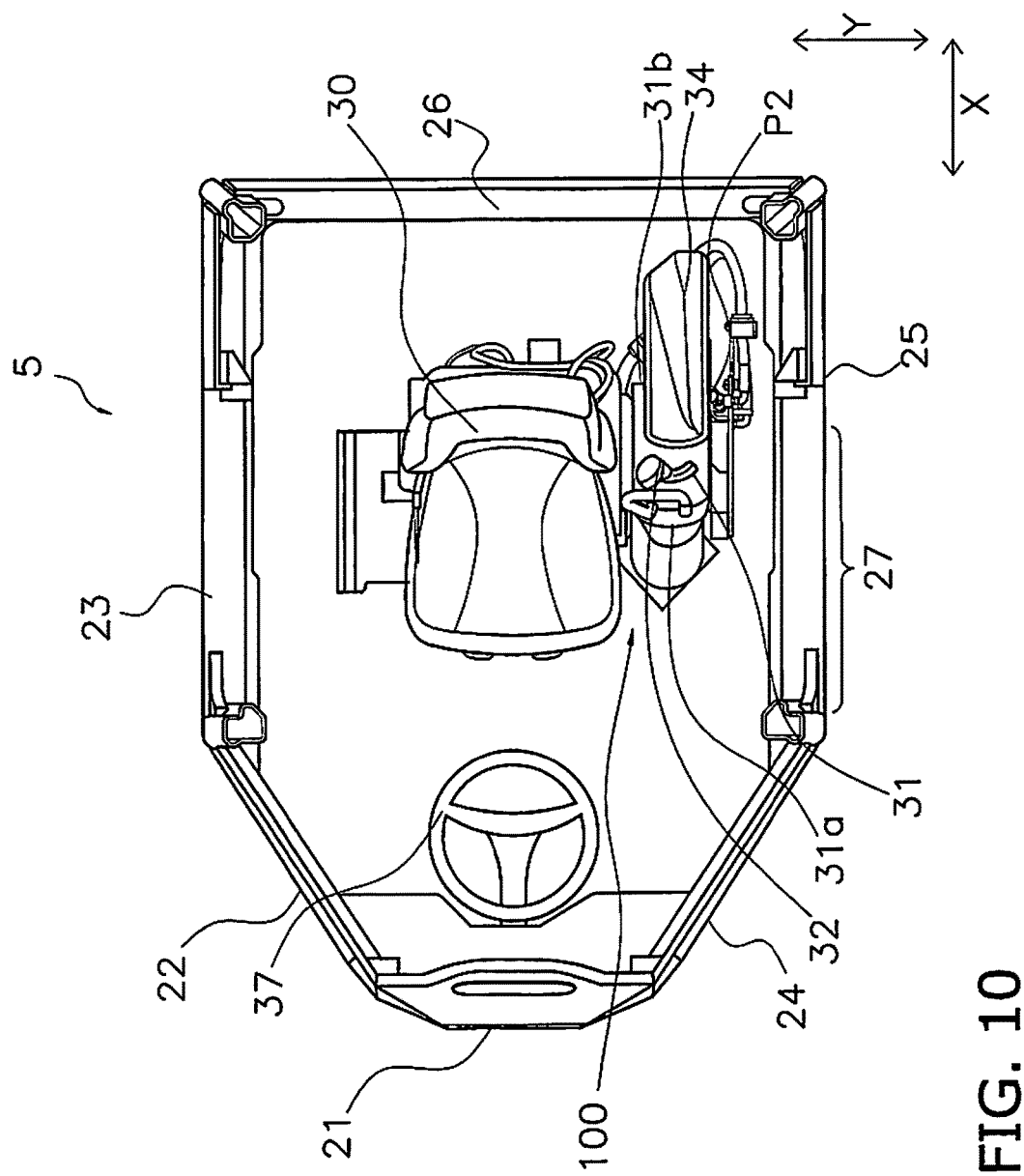
FIG. 10 is a top view of the state when the console box is disposed in the retracted position.
Figure 11:
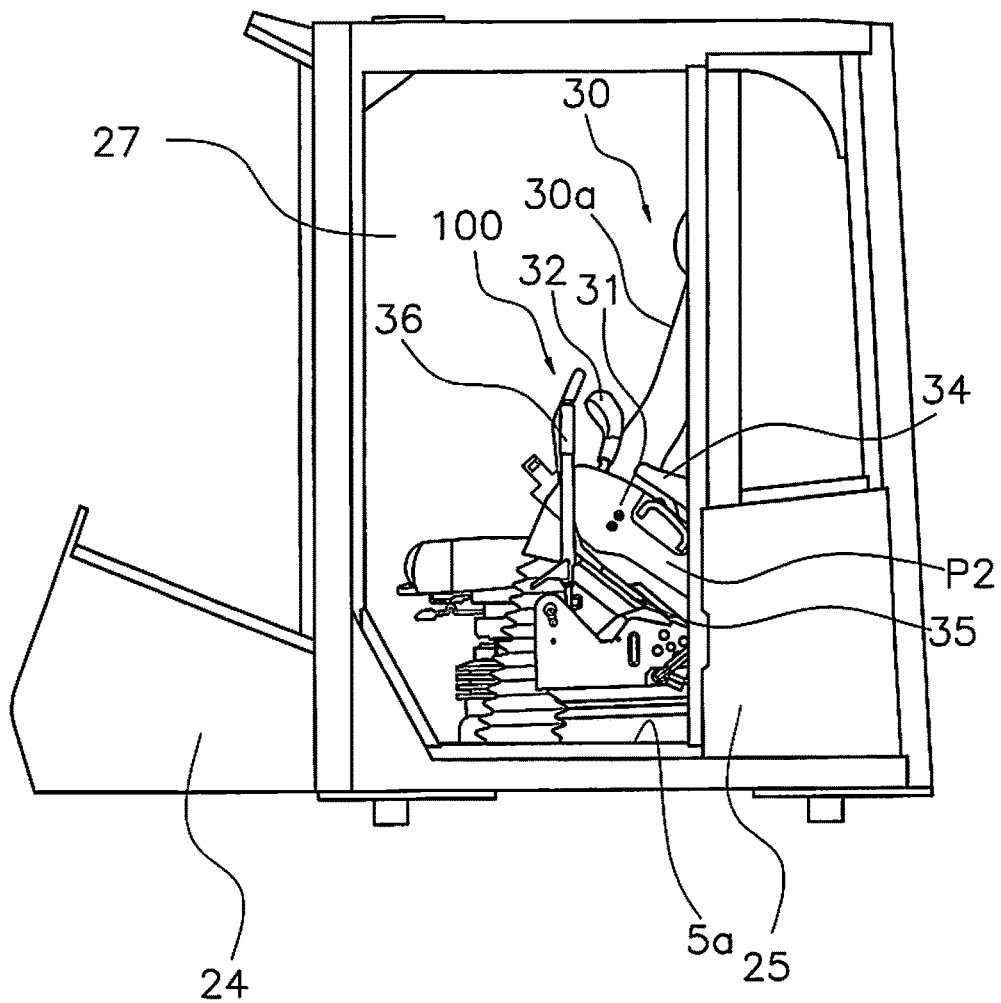
FIG. 11 is a left side view of the configuration of the cab in FIG. 1 in a state in which the console box is disposed in the retracted position.

FIG. 10 is a top view of the state when the console box 31 is disposed in the retracted position P2. FIG. 11 is a left side view of FIG. 10.

As shown in FIG. 10, in the retracted position P2, the console box 31 is disposed at an angle. More precisely, the rear end 31b of the console box 31 is located lower than the front end 31a.

As shown in FIGS. 3 and 11, when the console box 31 is rotated rearward to the retracted position P2, this makes it easier for the operator to move in and out of the door opening 27.

c. Slide Mechanism

Figure 12:
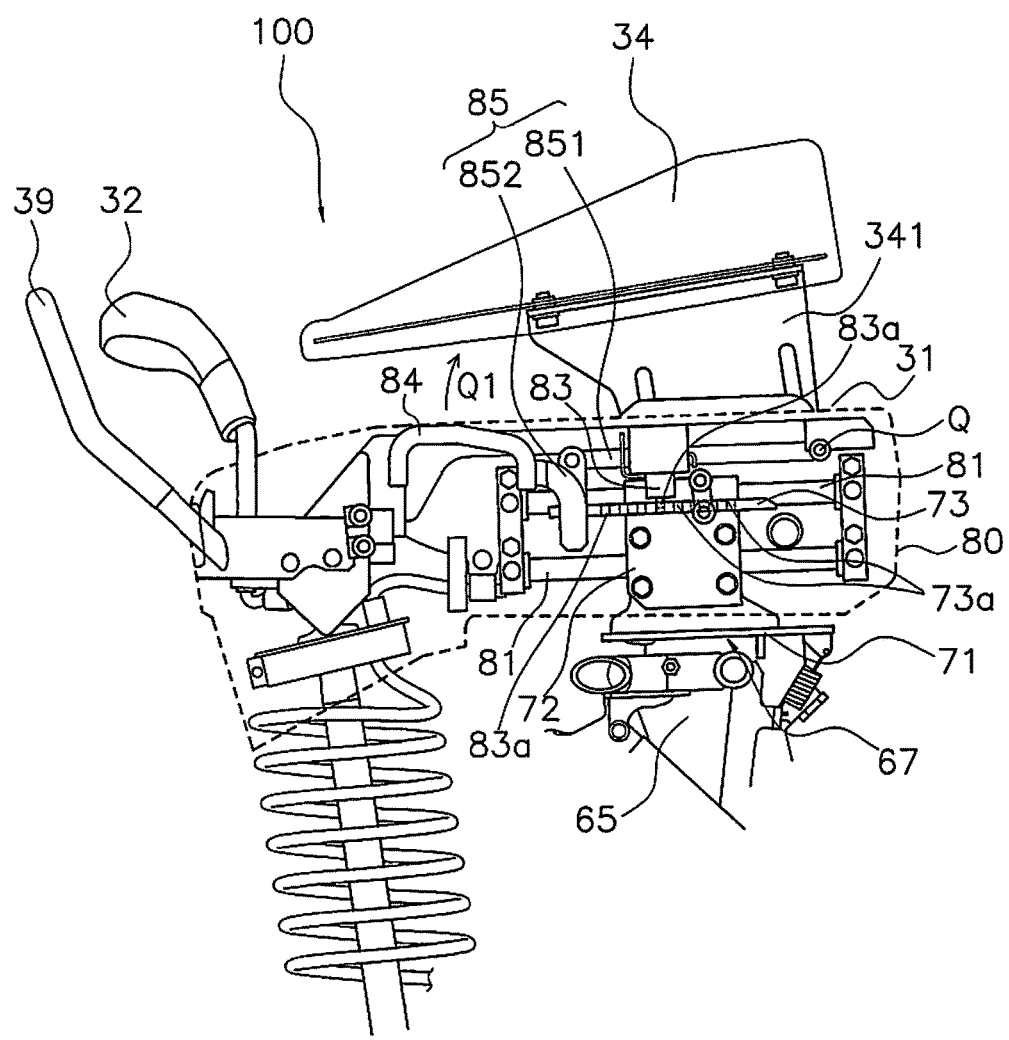
FIG. 12 shows the internal configuration of the console box in FIG. 4.

FIG. 12 shows the slide mechanism of the console box 31. As shown in this drawing, the third rotary part 67 has a connection 71, a rail support member 72, and a positioning member 73.

The connection 71 is connected to the upper ends of the first rotary part 65 and the second rotary part 66. The rail support member 72 is a cuboid member, is fixed to the connection 71 on the upper side of the connection 71, and slidably supports two rail members 81 (discussed below). The positioning member 73 is a flat member that is longer in the forward and backward direction, and is fixed to the rail support member 72. A plurality of holes 73a formed in the up and down direction are provided to the positioning member 73 in the forward and backward direction.

The console box 31 has an outer frame 80 (indicated by a dotted line in FIG. 12), the two rail members 81 fixed to the outer frame 80, a pin 83 fixed to the outer frame 80, a slide grip 84, and a linking component 85. The rail members 81 are provided in the forward and backward direction, and are supported slidably in the forward and backward direction by the rail support member 72. The pin 83 is disposed in the up and down direction, and a lower end 83a of the pin 83 fits into the above-mentioned holes 73a of the positioning member 73. This fixes the position of the console box 31 in the forward and backward direction. The slide grip 84 is provided on the left side face side of the outer frame 80 of the console box 31.

The linking component 85 links the slide grip 84 to the pin 83. The linking component 85 has a post-shaped portion 851 that is provided in the forward and backward direction and to which the pin 83 is fixed, and a linking portion 852 that links the post-shaped portion 851 to the slide grip 84. The post-shaped portion 851 is provided rotatably with respect to the rail members 81 around the rotary shaft Q of its rear end.

When the console box 31 is slid in the forward and backward direction, the slide grip 84 is grasped and lifted by the operator. Consequently, the linking component 85 rotates upward (in the direction of the arrow Q1) around the rotary shaft Q, and the pin 83 fixed to the linking component 85 also rotates upward. The rotation of the pin 83 causes its lower end 83a to be pulled upward and out of the holes 73a, resulting in a state in which the fixing is released. In this state, the rail members 81 can slide with respect to the rail support member 72, so the console box 31 can be slid in the forward and backward direction. If the console box 31 is moved downward at the desired position in the forward and backward direction, the lower end 83a of the pin 83 fits into the holes 73a, and the position of the console box 31 is fixed with respect to the third rotary part 67.

FIGS. 13A to 13C are side views of the state when the console box 31 has been slid in the operation position P1. FIG. 13A is a side view of the console box assembly 100 in a state in which the console box 31 has been moved all the way to the rear in the operation position. FIG. 13B is a side view of the console box assembly 100 in a state in which the console box 31 has been moved to an intermediate position in the forward and backward direction in the operation position. FIG. 13C is a side view of the console box assembly 100 in a state in which the console box 31 has been moved all the way to the front in the operation position.

As shown in FIGS. 13A to 13C, the console box 31 slides in the forward and backward direction. The center of gravity H of the console box 31 here is provided more to the front than the rotary shaft A of the console box 31 even in a state in which the console box 31 has been slid all the way to the rear. J indicates a vertical line passing through the rotary shaft A. This center of gravity H refers to the center of gravity of the overall configuration, including the components that rotate along with the console box 31, such as the rotary frame 52.

With this configuration, when the console box 31 is rotated rearward, the console box 31 tries to return to the operation position P1 under its own weight, based on the position of the center of gravity H, until the center of gravity H goes past the vertical line J to the rear. This prevents the console box 31 from rotating rearward as a result of vibration or the like.

Figure 14A:
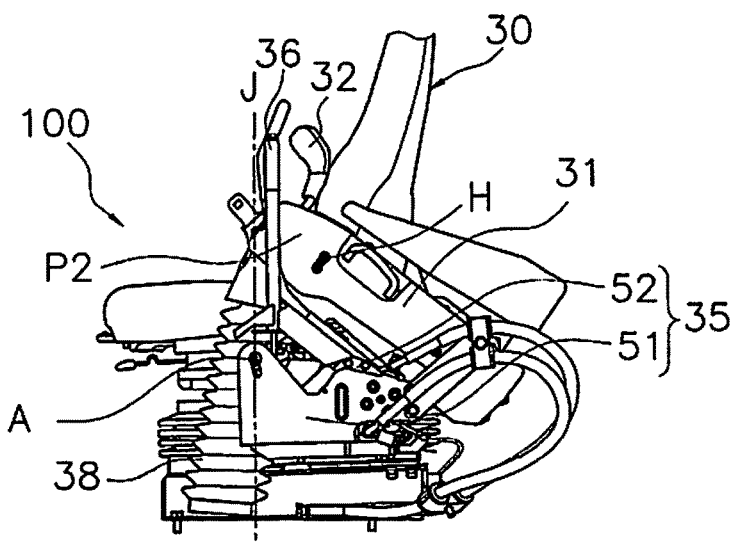
FIGS. 14A to 14C are side views illustrating the center of gravity position in the retracted position when the console box in FIG. 3 has been slid.
Figure 14B:
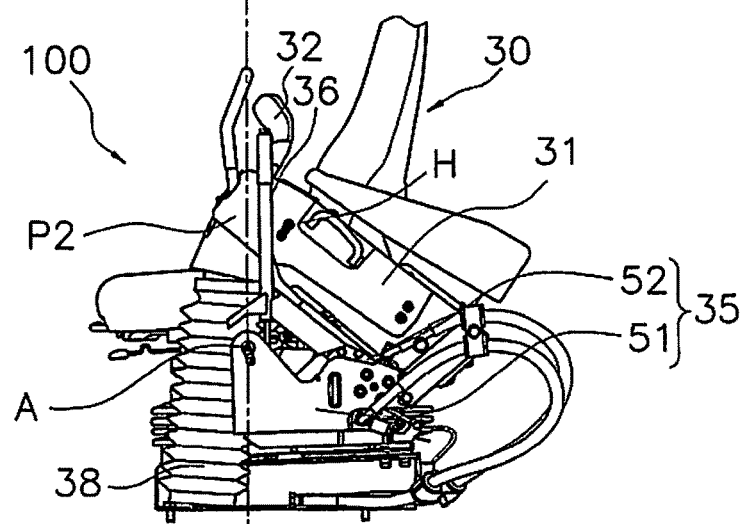
Figure 14C:
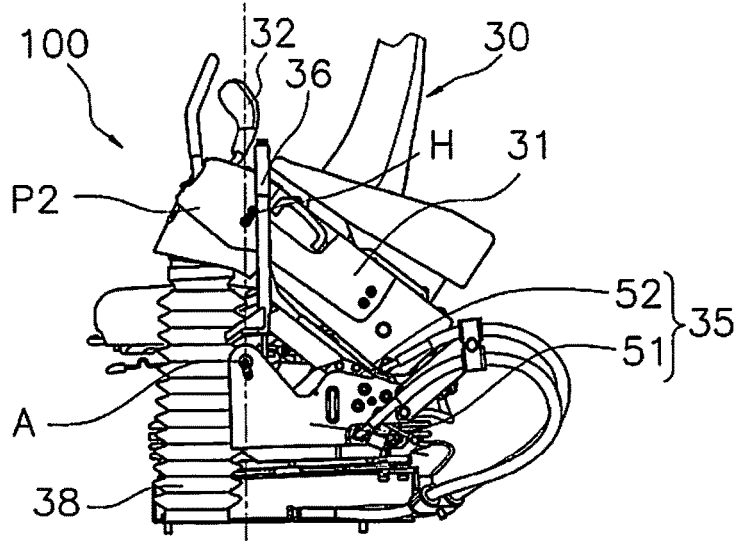

FIGS. 14A to 14C are side views of the state when the console box 31 has been slide in the retracted position P2. FIG. 14A is a side view of the console box assembly 100 in a state in which the console box 31 has been moved all the way to the rear in the retracted position P2. FIG. 14B is a side view of the console box assembly 100 in a state in which the console box 31 has been moved to an intermediate position in the forward and backward direction in the retracted position. FIG. 14C is a side view of the console box assembly 100 in a state in which the console box 31 has been moved all the way to the front in the retracted position.

As shown in FIGS. 14A to 14C, the console box 31 slides in the forward and backward direction. The center of gravity H of the console box 31 here is provided more to the rear than the rotary shaft A of the console box 31, even in a state in which the console box 31 has slide all the way forward.

With the above configuration, when the console box 31 rotates forward, the console box 31 tries to return to the retracted position P2 under its own weight, based on the position of the center of gravity H, until the center of gravity H passes the vertical line J to the front. This prevents the console box 31 from rotating forward as a result of operator contact, etc.

1-5-7. Rotary Lever

Figure 15:
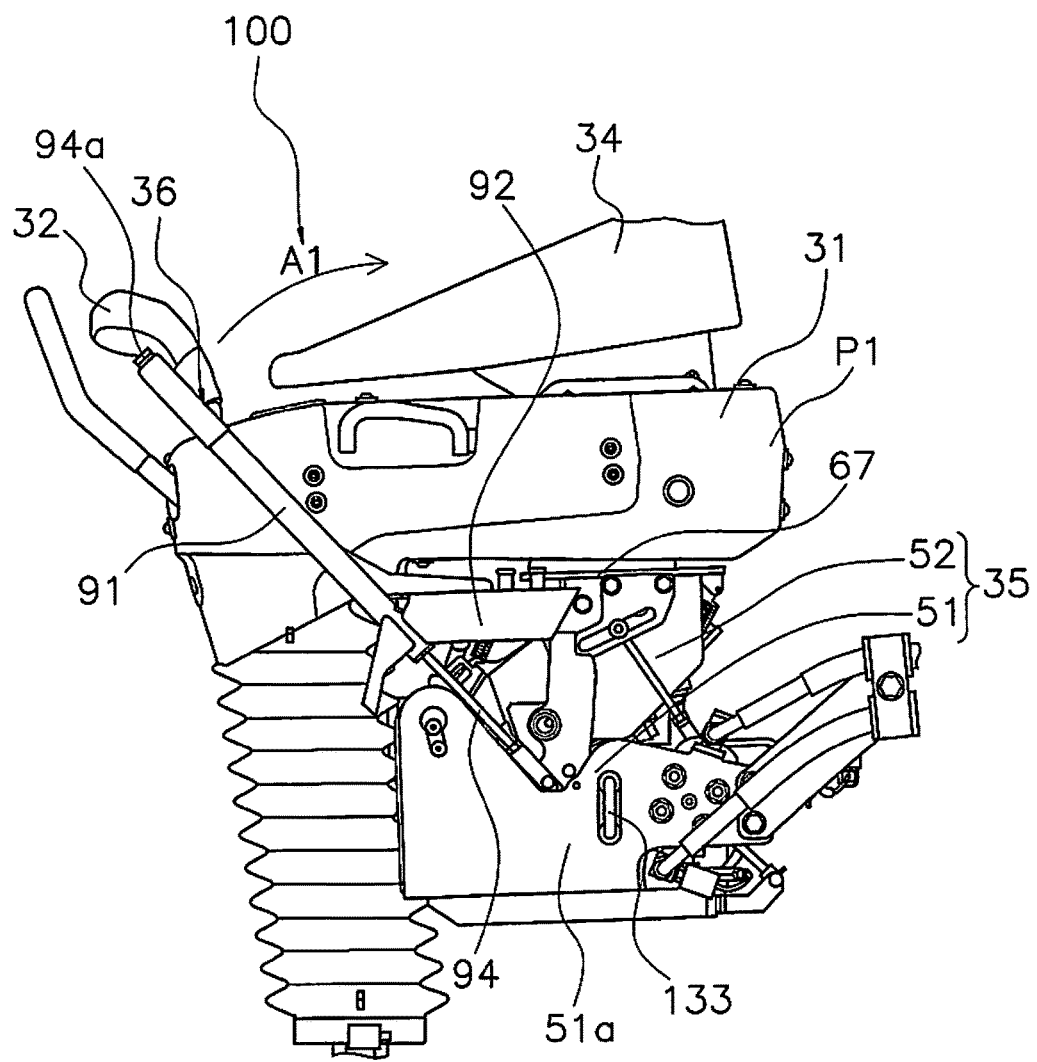
FIG. 15 is a side view in which part of an outer cover has been removed from the console box assembly in FIG. 3, to illustrate the rotary lever.

The rotary lever 36 is grasped by the operator when the console box 31 is rotated. FIG. 15 shows the configuration of the console box assembly 100 in a state in which the covers 53a and 53b (see FIG. 4) provided to the left side face of the fixed frame 51 have been removed.

The rotary lever 36 is provided to the left side face of the console box assembly 100. The rotary lever 36 mainly has a grip 91, a contact component 92, an unlocking component 93 (see FIG. 5), and an insertion member 94. The grip 91 is a cylindrical member that is grasped by the operator. This will be discussed in greater detail below, but the post-shaped insertion member 94, which is used for unlocking the retracted position locking mechanism 114, is disposed on the inside of the cylindrical shape. The upper end of the insertion member 94 protrudes from to the upper end of the grip 91, and forms a push button 94a. The push button 94a is used to release the retracted position locking mechanism 114 (discussed below), and will be described in more detail below.

The contact component 92 hits the rotary frame 52 when the rotary lever 36 is rotated, causing the rotary frame 52 to rotate. As shown in FIGS. 5 and 15, the contact component 92 extends substantially horizontally from the lower end of the grip 91 to the lower side of the third rotary part 67. In FIG. 5, the contact component 92 is depicted as being cut off midway. As shown in FIG. 5, the unlocking component 93 is linked to the contact component 92, and releases the operation position locking mechanism 113 (discussed below). The unlocking component 93 is provided facing downward from the rear end of the contact component 92. The contact component 92 and the unlocking component 93 are rotatably fixed at the upper end of the unlocking component 93 and the rear end of the contact component 92, inside the first rotary part 65 of the rotary frame 52. The rotary shaft B thereof is shown in FIG. 5. The rotary shaft B is provided on the lower side of the third rotary part 67. One end of a spring member 95 is linked to the rear portion of the unlocking component 93. The other end of this spring member 95 is linked to the rear end of the third rotary part 67 of the rotary frame 52. One end of the spring member 95 is disposed under and ahead of the other end. The spring member 95 biases the entire rotary lever 36 to rotate forward around the rotary shaft B (the arrow B2 direction).

Figure 16:
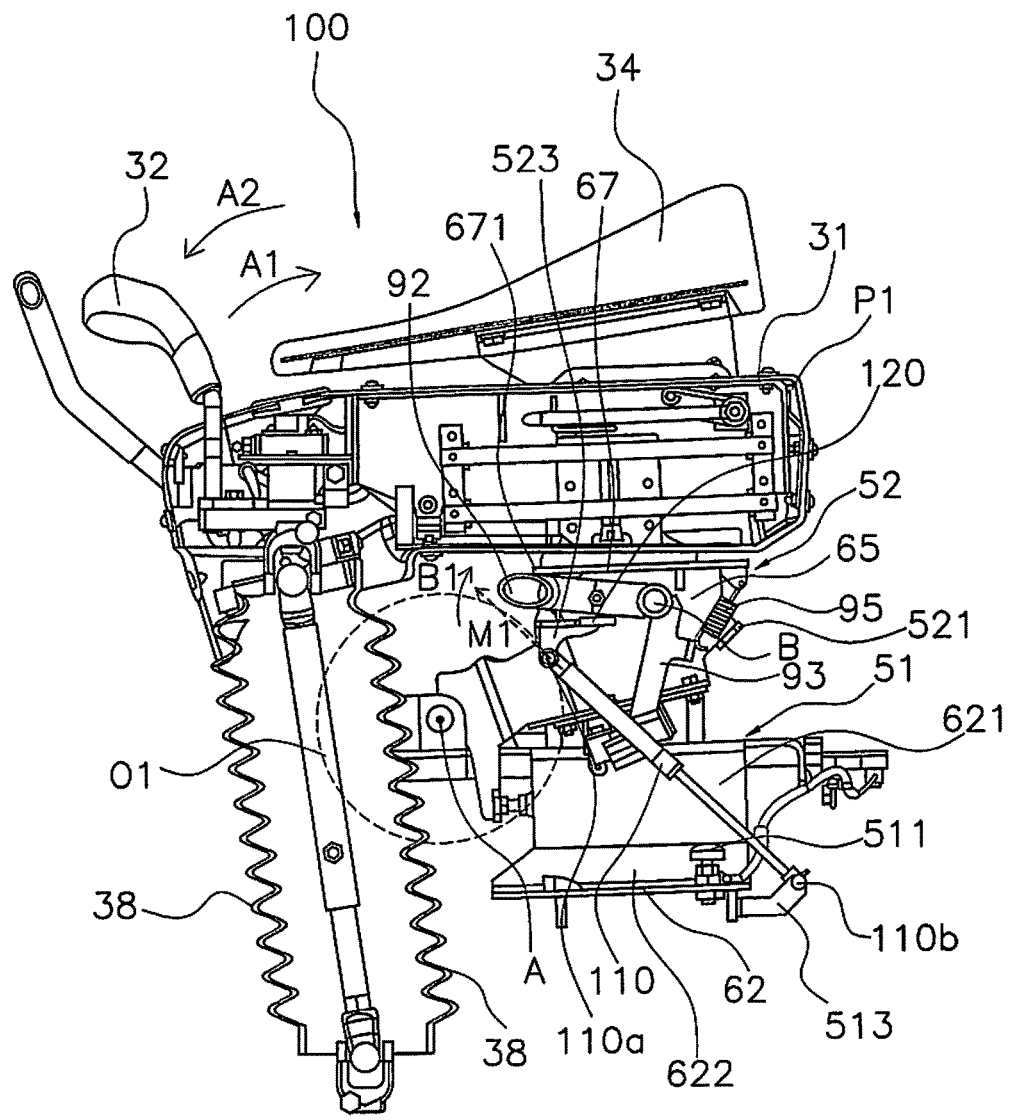
FIG. 16 is a side cross section of the console box assembly in FIG. 3, to illustrate a gas cylinder.

When the operator rotates the rotary lever 36 in the arrow B1 direction, the rotary lever 36 rotates rearward with respect to the rotary frame 52 around the rotary shaft B shown in FIG. 5, which releases the operation position locking mechanism 113 (discussed below). When the operator further rotates the rotary lever 36 in the arrow B1 direction, the contact component 92 hits a contacted part 671 (see FIG. 5) of the third rotary part 67 from below. As shown in FIG. 5, the contacted part 671 is formed above the contact component 92 in an eave shape that protrudes forward along the contact component 92. FIG. 16 shows the state when the contact component 92 is in contact with the contacted part 671 of the third rotary part 67. When the rotary lever 36 is further rotated in the arrow B1 direction from this state, the rotary frame 52 rotates rearward (arrow A1) around the rotary shaft A along with the rotation of the rotary lever 36. Thus, the rotary shaft A of the console box 31 is in a different position from that of the rotary shaft B of the rotary lever 36, and is provided more to the front than the rotary shaft B. Accordingly, the rearward and forward rotation of the console box 31 are indicated by the arrows A1 and A2, and the rearward and forward rotation of the rotary lever 36 are distinguished by the arrows B1 and B2, but in the left side view shown in FIG. 16, the arrows A1 and B1 both indicate the right rotation direction, while the arrows A2 and B2 both indicate the left rotation direction.

As shown in FIG. 3, in a state in which the console box 31 is disposed in the operation position P1, the rotary lever 36 is blocking the passage between the operator's seat 30 and the door opening 27, so the operator cannot get in or out. On the other hand, as shown in FIG. 11, in a state in which the console box 31 is disposed in the retracted position P2, the rotary lever 36 is retracted from the passage between the operator's seat 30 and the door opening 27, so the operator can get in and out.

1-5-8. Gas Spring

As shown in FIG. 8, the gas spring 110 is provided on the inside of the support component 35. More precisely, it is provided on the inside of the substantially U-shaped fixed component 62, and between the first rotary part 65 and the second rotary part 66.

Figure 17:
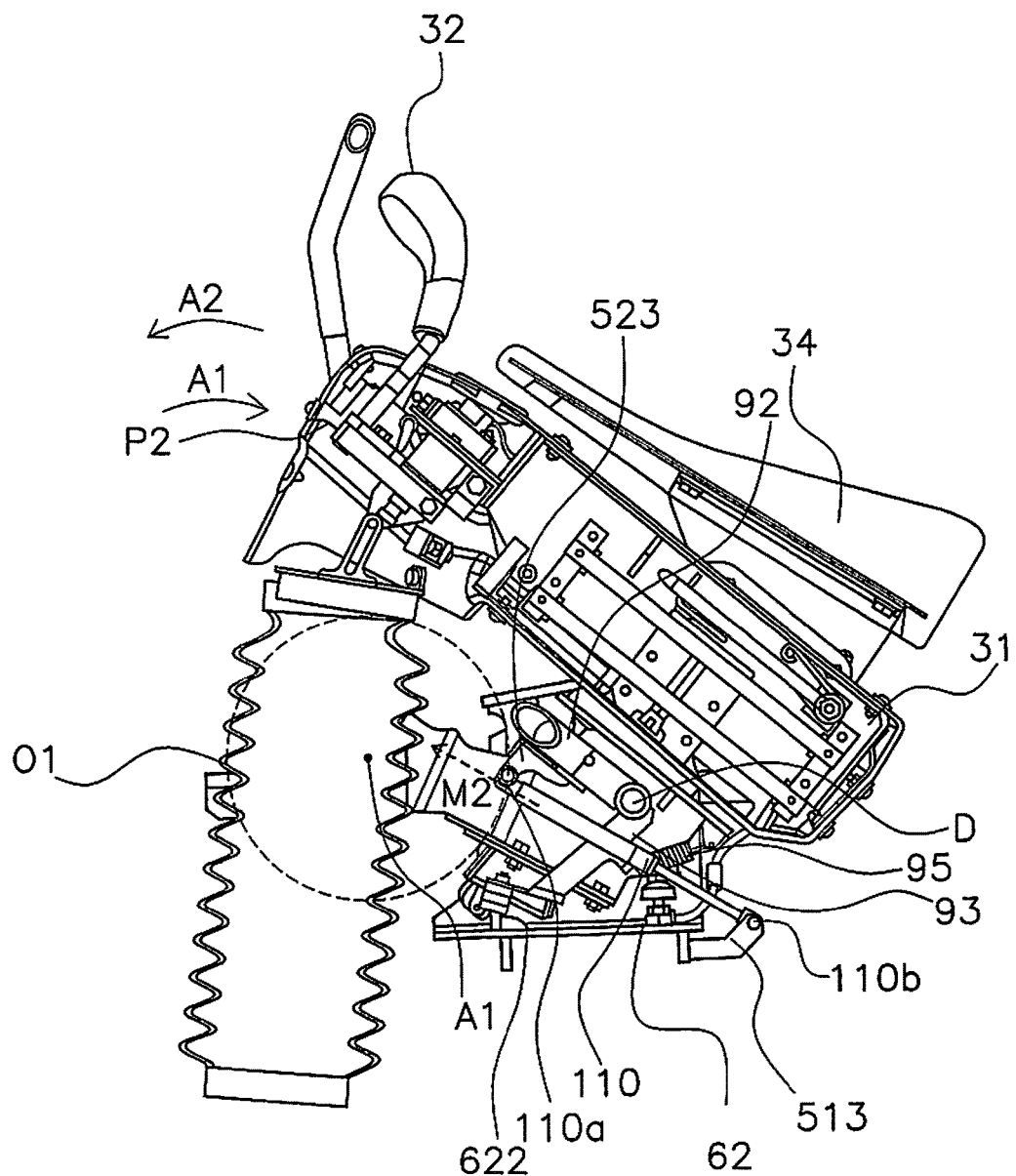
FIG. 17 is a side cross section of the state when the console box has been rotated from the state in FIG. 16 to the retracted position.
Figure 18:
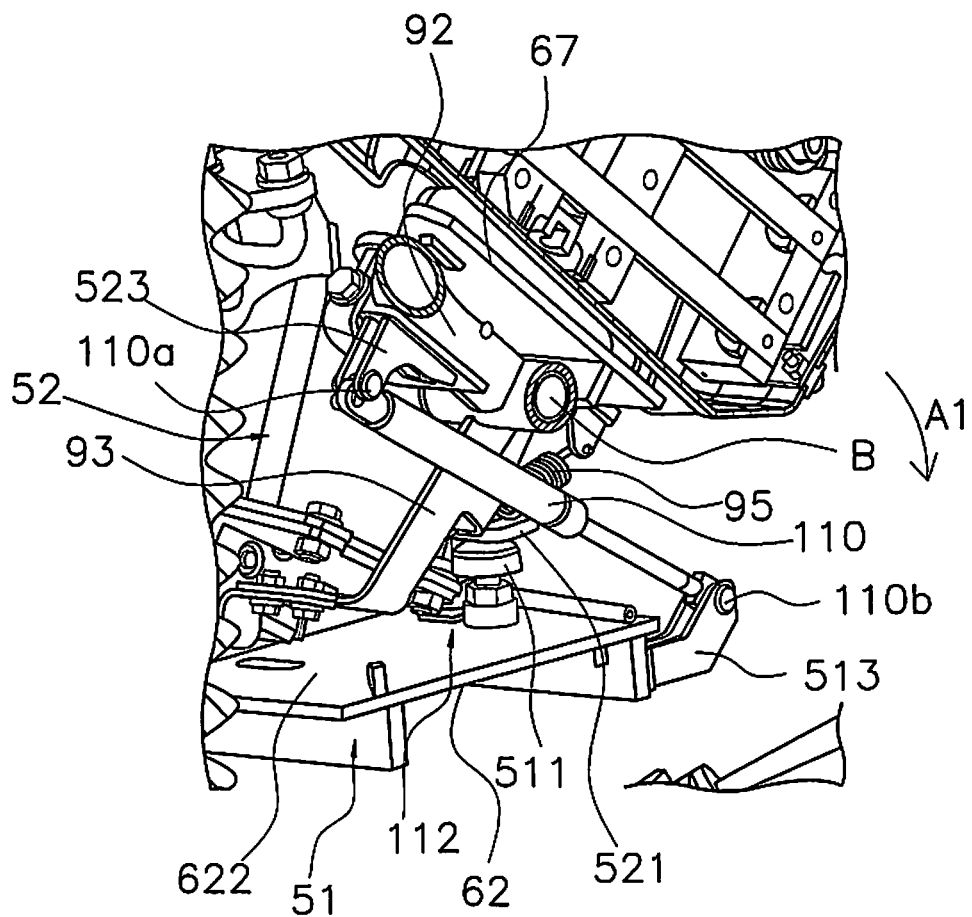
FIG. 18 is an oblique view of the area near the gas cylinder in FIG. 17.

FIG. 17 is a side view of the state of the gas spring 110 when the console box 31 has been rotated to the retracted position P2. FIG. 18 is an oblique view of the state of the gas spring 110 when the console box 31 has been rotated to the retracted position P2.

As shown in FIG. 6 and FIGS. 16 to 18, the upper end 110a of the gas spring 110 is rotatably attached to the rotary frame 52 via a bracket 523. The upper end 110a is located lower than the contact component 92 of the rotary lever 36.

The lower end 110b of the gas spring 110 is rotatably attached to the bottom face 622 of the fixed component 62 via a bracket 513.

The lengthwise direction of the gas spring 110 runs in the forward and backward direction in plan view, its upper end 110a is located more to the front than the lower end 110b, and the upper end 110a is located higher than the lower end 110b.

The gas spring 110 biases in the extension direction, and its upper end 110a is located more to the rear than the rotary shaft A of the console box 31, so as shown in FIG. 16, in the operation position P1 the console box 31 is biased in the forward rotational direction (the arrow A2 direction).

As shown in FIG. 16, the gas spring 110 is disposed so that in a state in which the console box 31 is disposed in the operation position P1, the extension direction of the gas spring 110 substantially matches the linear direction (the M1 direction) of a circle O1 whose center is the rotary shaft A of the console box 31. This allows the biasing force of the gas spring 110 to be exerted more efficiently.

The gas spring 110 contracts along with the rotation of the console box 31, and in a contracted state, as shown in FIG. 17, the extension direction of the gas spring 110 departs from the linear direction of the circle O1, and moves to the rotary shaft A direction. Consequently, in the retracted position P2, the forward biasing force of the gas spring 110 on the console box 31 can be reduced. Therefore, the weight of the console box 31 is greater than the biasing force produced by the gas spring 110, and the console box 31 can be stably disposed in the retracted position P2. To put this another way, the rotational moment produced in the console box 31 by the biasing force of the gas spring 110 in the retracted position P2 is less than the rotational moment produced by the weight of the console box 31.

Also, the gas spring 110 can adjust the angle to switch the return to the operation position P1 and the return to the retracted position P2. For example, if the center of gravity position of the console box 31 should be shifted from the desired position due to some error, this can be adjusted for by the gas spring 110.

1-5-9. Operation Position Stopper

Figure 20:
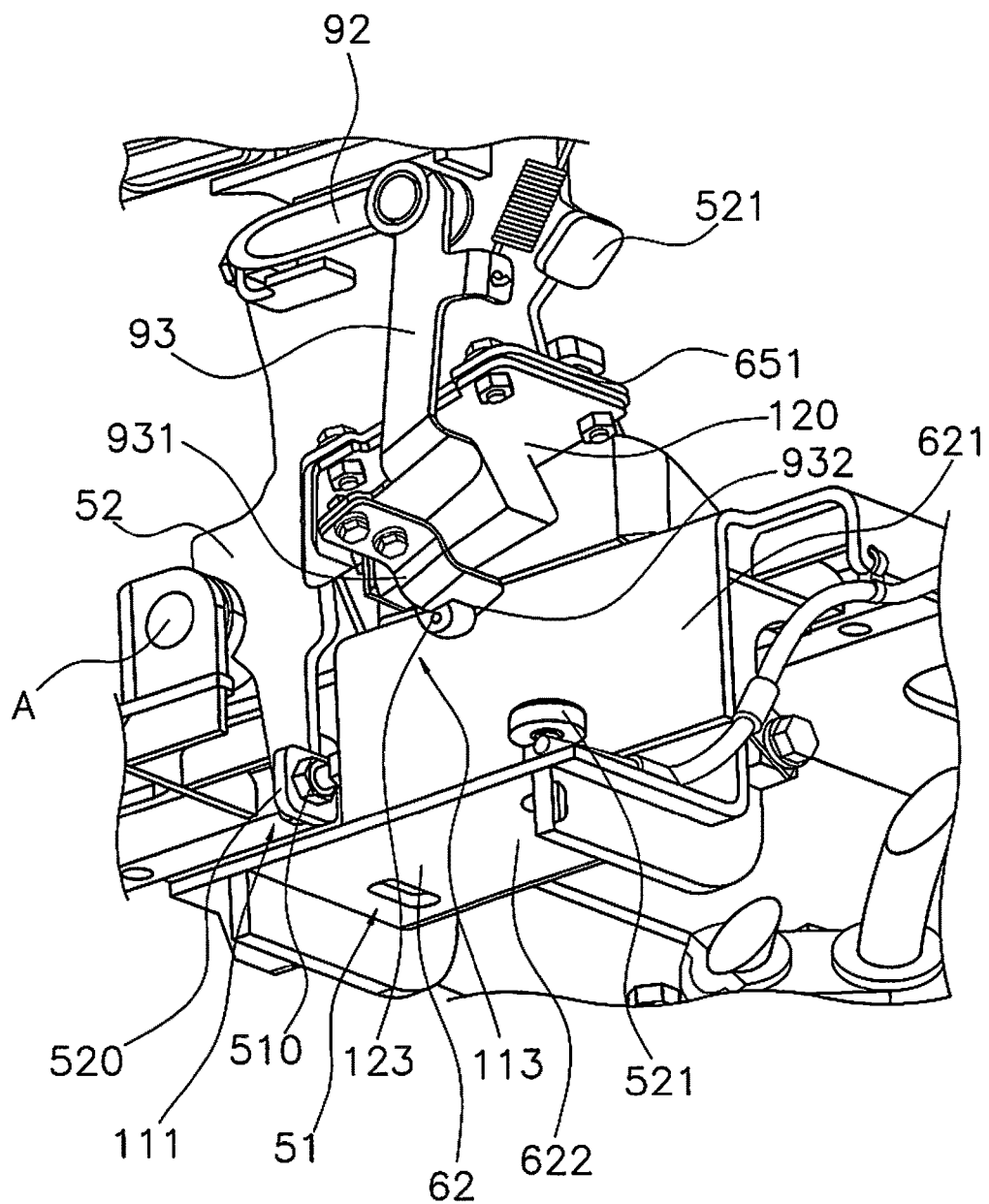
FIG. 20 is an oblique view of FIG. 19 as seen from the rear.

The operation position stopper 111 stops the console box 31 in the operation position P1 when the console box 31 is rotated forward from the retracted position P2 toward the operation position P1. As shown in FIGS. 5 and 20 (discussed below), the operation position stopper 111 has a first contact component 520 provided to the rotary frame 52, and a first contacted component 510 provided to the fixed frame 51. The first contact component 520 protrudes downward from the rear side of the rotary shaft A of the first rotary part 65. Also, the first contacted component 510 is provided so as to protrude forward from the front end of the fixed component 62 of the fixed frame 51, and is a bolt stopper. When the console box 31 is rotated forward from the retracted position P2 toward the operation position P1 (the arrow A2 direction), the first contact component 520 rotates rearward (arrow A2) and hits the first contacted component 510 from the front. Consequently, the rotation of the console box 31 stops in the operation position P1.

1-5-10. Retracted Position Stopper

The retracted position stopper 112 stops the console box 31 in the retracted position P2 when the console box 31 is rotated rearward from the operation position P1 toward the retracted position P2.

As shown in FIG. 18, the retracted position stopper 112 has a second contact component 521 provided to the rotary frame 52, and a second contacted component 511 provided to the fixed frame 51. As shown in FIG. 6, the second contact component 521 is disposed to the rear of the spring member 95 in the operation position P1, and as shown in FIG. 18, is disposed under the spring member 95 in the retracted position P2. The second contacted component 511 is provided on the bottom face 622 of the fixed component 62 so as to protrude above, and its distal end is formed from a rubber member or the like.

When the console box 31 is rotated rearward from the operation position P1 toward the retracted position P2 (the arrow A1 direction), the second contact component 521 rotates rearward (arrow A1) and hits the second contacted component 511 from above. Consequently, the rotation of the console box 31 stops in the retracted position P2.

1-5-11. Operation Position Locking Mechanism

Figure 19:
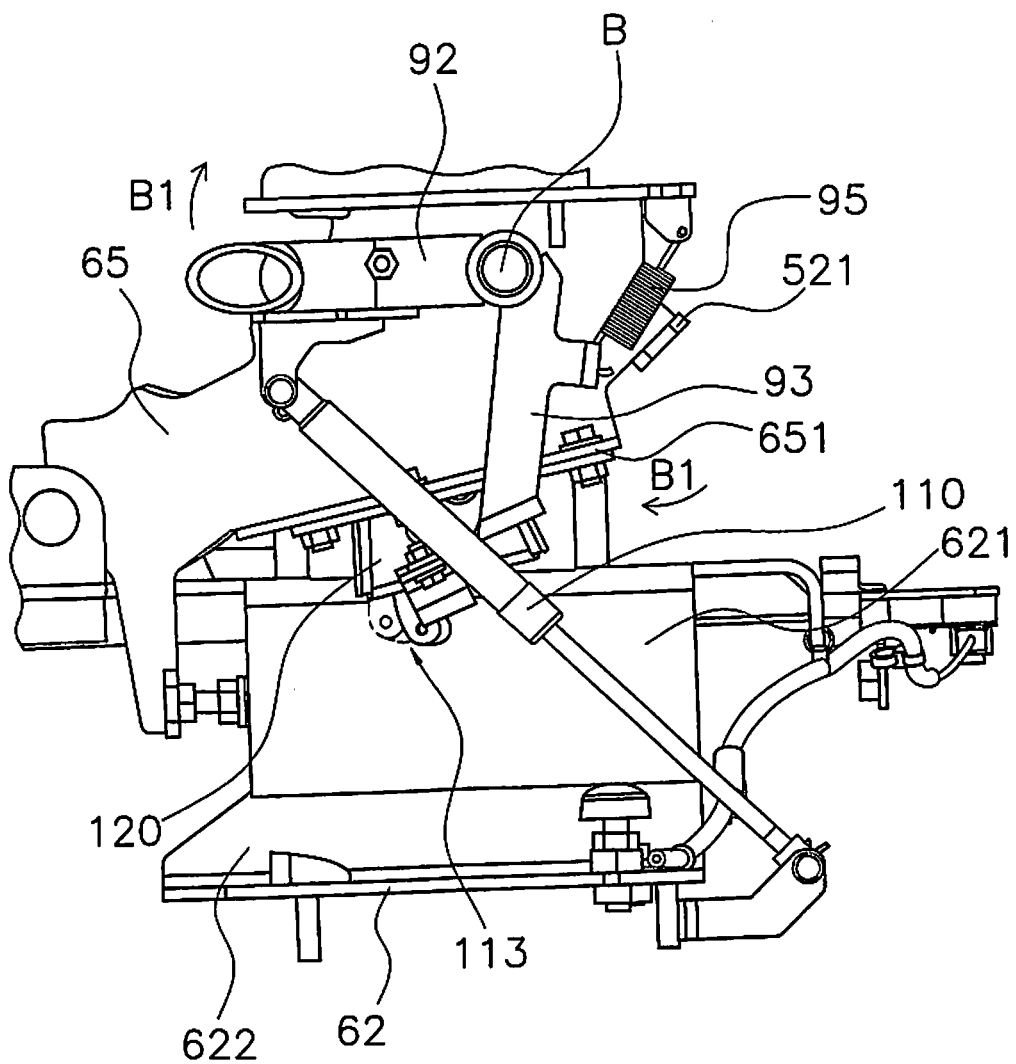
FIG. 19 is a detail view of the area near the operation position locking mechanism in FIG. 16.
Figure 21:
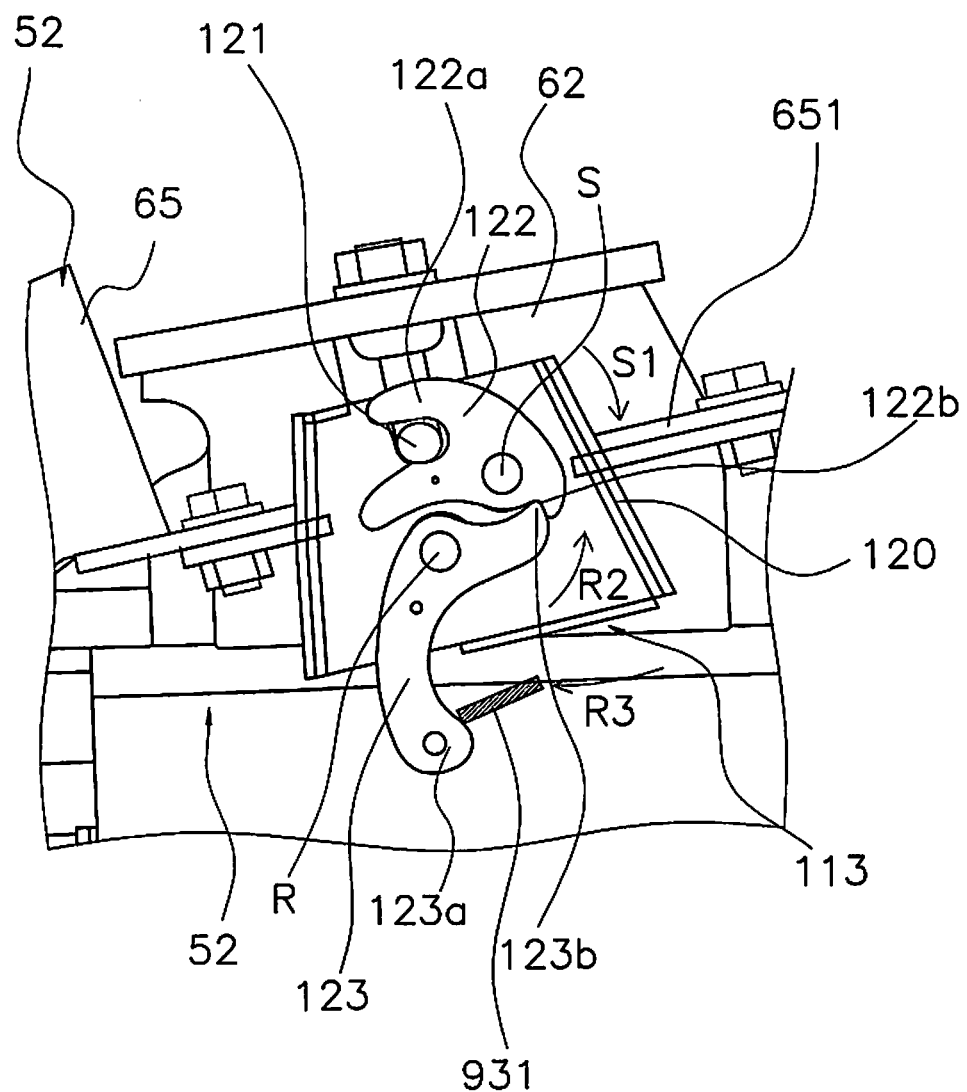
FIG. 21 shows the internal configuration of the operation position locking mechanism in FIG. 19.

FIG. 19 is a detail view of the area near the operation position locking mechanism 113. FIG. 20 is an oblique view of FIG. 19 from below. FIG. 21 shows the internal configuration of the operation position locking mechanism 113, and depicts a locked state.

As shown in FIG. 8, the operation position locking mechanism 113 is disposed near the inside of the right side face 621 of the fixed component 62. As shown in FIG. 21, the operation position locking mechanism 113 has a support cover 120, a striker 121, a pawl member 122, and a locking release lever 123.

The support cover 120 is fixed to the first rotary part 65 of the rotary frame 52. More precisely, the support cover 120 is fixed to a locking mechanism support 651 formed facing inward from the first rotary part 65.

The striker 121 is a post-shaped member disposed in the left and right direction, and is fixed to the fixed component 62 of the fixed frame 51.

The pawl member 122 is a flat member, and is rotatably supported by the support cover 120, with the left and right direction serving as an axis S. The pawl member 122 has a mating component 122a that mates with the striker 121. Also, using the axis S as a reference, a concave component 122b is formed substantially on the opposite side from the mating component 122a, and under it in FIG. 21. The pawl member 122 is biased by a spring member provided along the axis S, toward the right rotation in FIG. 21 (see the arrow S1). The arrow S1 could also be called the rearward rotational direction of the console box 31.

The locking release lever 123 is a flat member, and is rotatably supported by the support cover 120, with the left and right direction serving as an axis R. The axis R is provided below and ahead of the axis S. The locking release lever 123 has a lever part 123a that protrudes downward from the support cover 120 and is pushed forward by the unlocking component 93. Also, using the axis R as a reference, a protrusion 123b is formed on substantially the opposite side from the lever part 123a. The protrusion 123b fits into the concave component 122b of the pawl member 122 in a locked state. Also, the locking release lever 123 is biased by a spring member provided along the axis R, toward the left rotation in FIG. 21 (see the arrow R2). The arrow R2 could also be called the forward rotational direction of the console box 31.

As shown in FIG. 21, the striker 121 fixed to the fixed frame 51 mates with the mating component 122a of the pawl member 122, and the pawl member 122 is biased by the locking release lever 123 (the spring member provided along the axis S) in the direction of mating with the striker 121.

Figure 22:
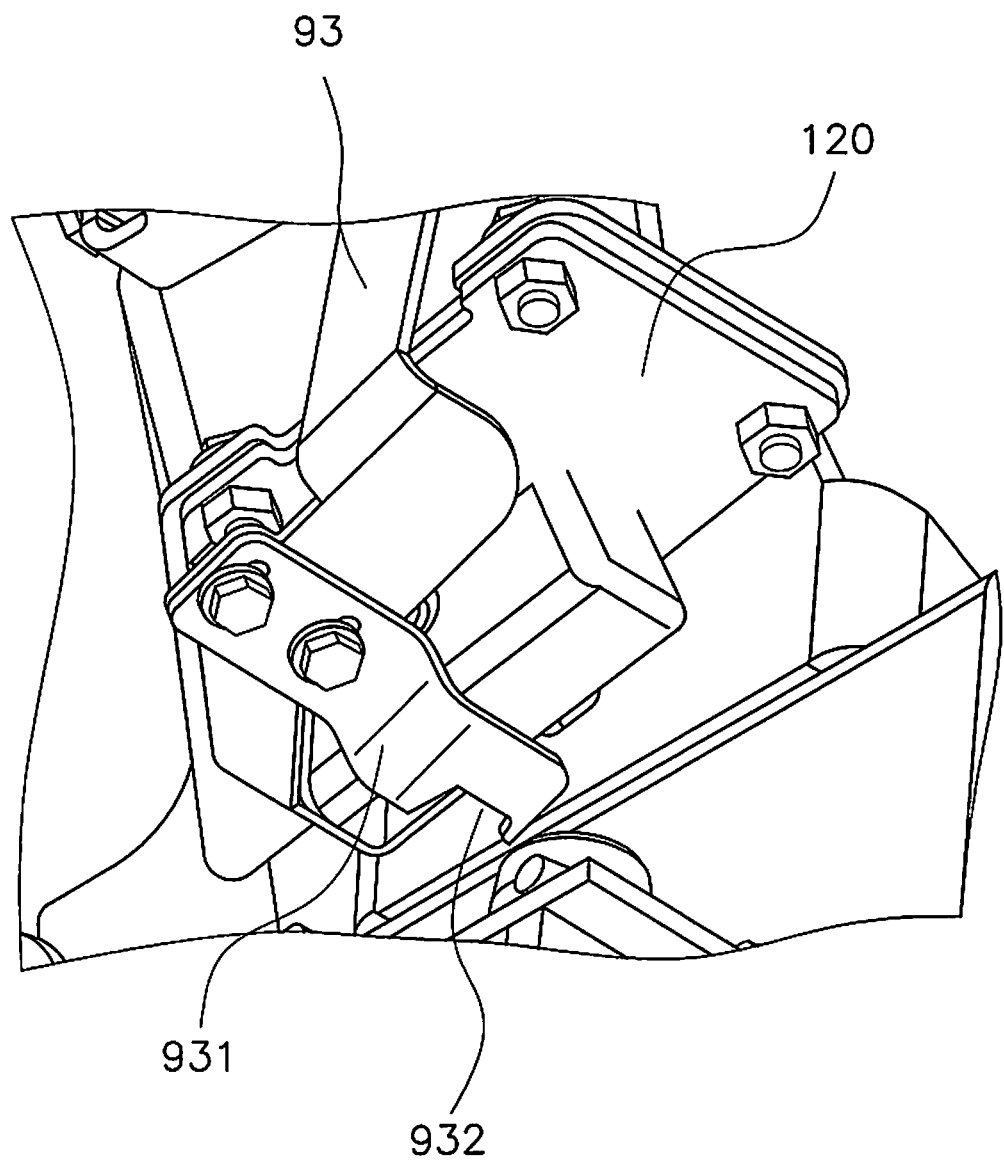
FIG. 22 is an oblique view of the lever contact component in FIG. 20.

As shown in FIG. 20, meanwhile, the unlocking component 93 has on its lower end a lever contact component 931. The lever contact component 931 is formed so that it is bent inward. FIG. 22 shows the state when the locking release lever 123 has been removed. As shown in FIG. 22, a cutout 932 is formed in the front end of the lever contact component 931. The lever part 123a of the locking release lever 123 fits into the cutout 932. Only part of the lever contact component 931 is depicted in FIG. 21.

Figure 23:
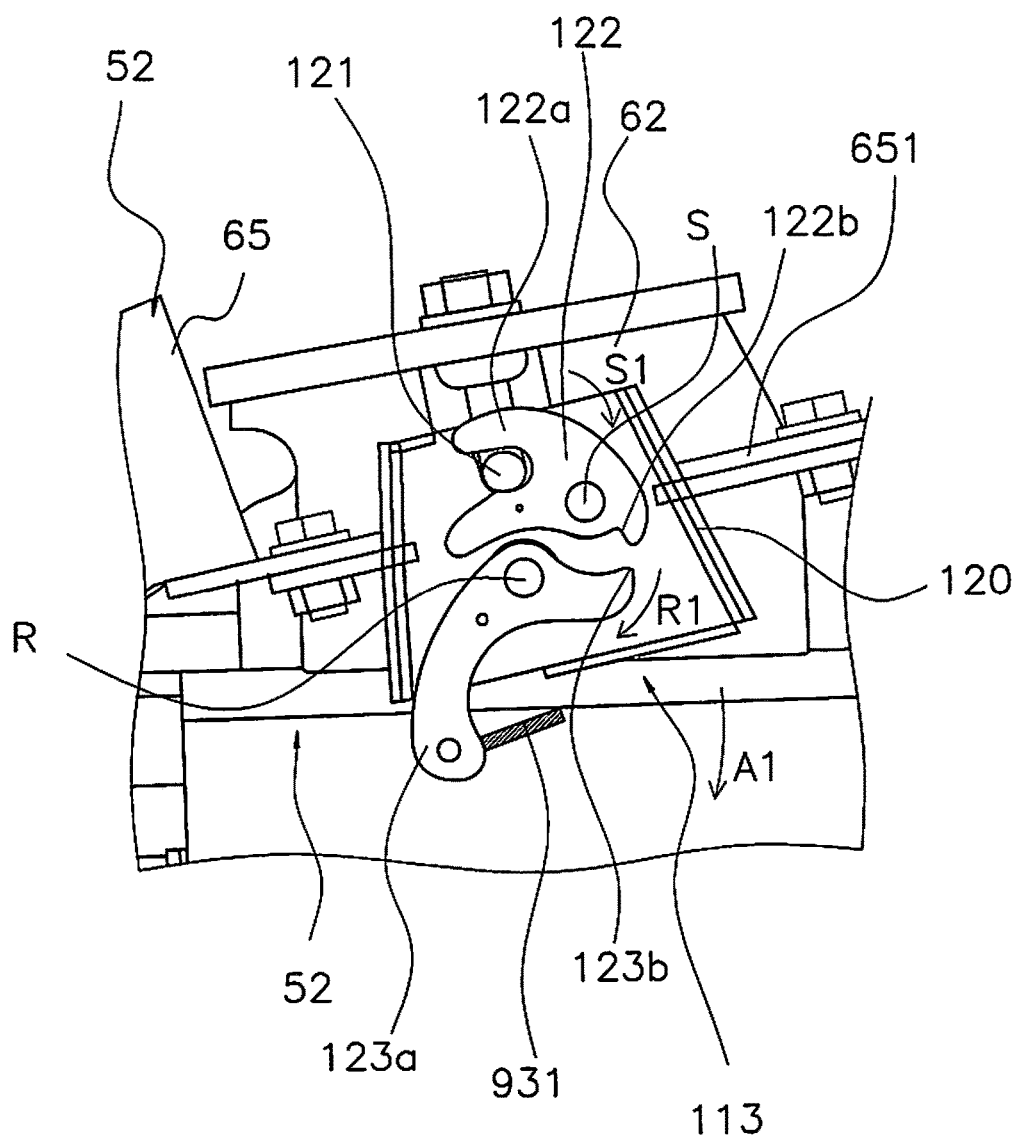
FIG. 23 is a diagram illustrating the operation when the console box is unlocked from the state in FIG. 21.

When the operator rotates the rotary lever 36 rearward from the locked state shown in FIG. 21, since the rotary lever 36 rotates around the rotary shaft B (see FIG. 16), the lever contact component 931 moves forward (see the arrow B1 in FIG. 19). This rotation of the lever contact component 931 causes the locking release lever 123 to rotate in the arrow R1 direction (the opposite direction from R2) around the axis R as shown in FIG. 23, and the protrusion 123b comes out of the concave component 122b of the pawl member 122.

After this, when the rotary lever 36 is rotated further to the rear, as shown in FIG. 16, the rotary lever 36 hits the contacted part 671 of the third rotary part 67, and the rotary frame 52 rotates rearward around the rotary shaft A. This rotation causes the support cover 120, the pawl member 122, and the locking release lever 123 to rotate downward (see the arrow A1 in FIG. 24).

Figure 24:
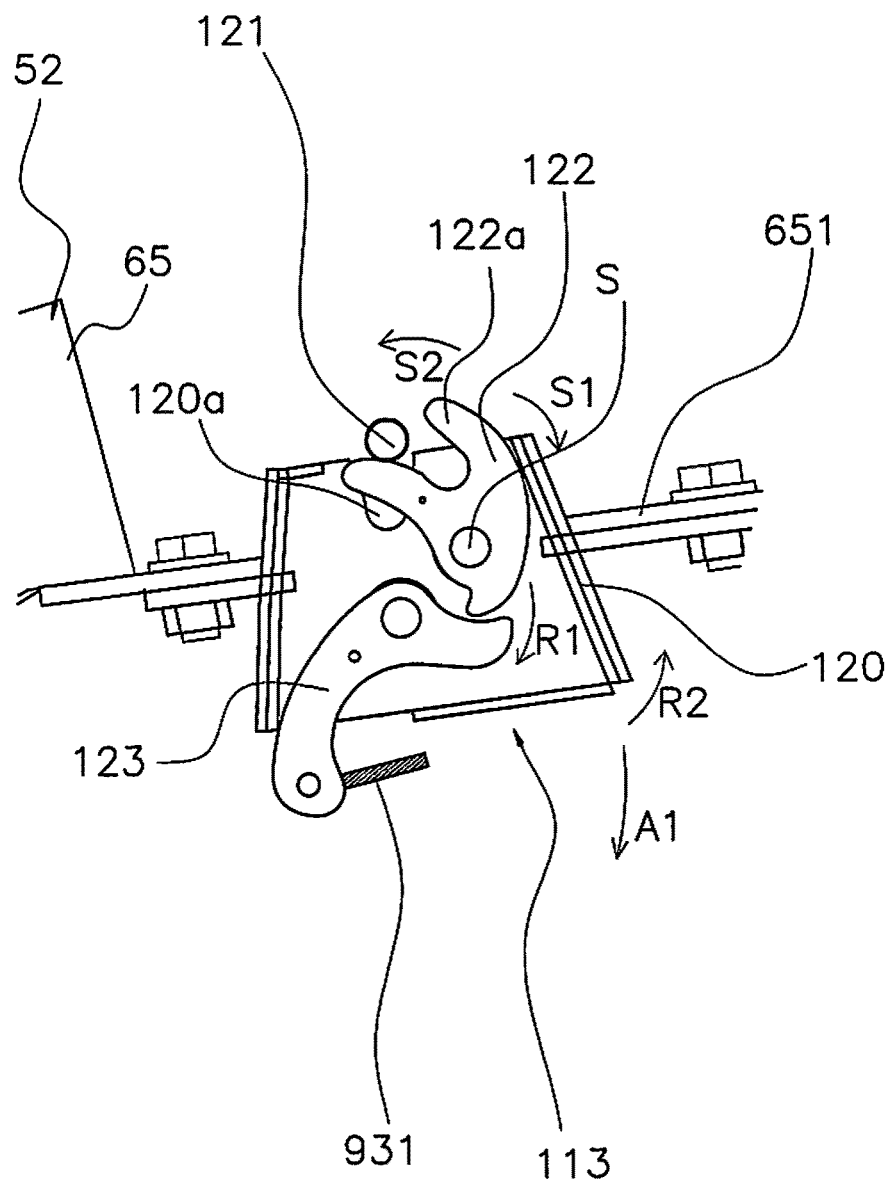
FIG. 24 is a diagram illustrating the operation when the console box is unlocked from the state in FIG. 21.

As the support cover 120 rotates downward, the pawl member 122 rotates in the S1 direction, so that the mating component 122a moves away from the striker 121 as shown in FIG. 24. At this point, the striker 121 goes through a cutout 120a formed in the support cover 120.

As discussed above, the operation position locking mechanism 113 can be unlocked by rotating the rotary lever 36 rearward.

Specifically, when the rotary lever 36 is not rotated, the mating of the striker 121 with the pawl member 122 means that the rotary frame 52 cannot rotate rearward, so the console box 31 cannot rotate, either. This prevents the console box 31 from rotating rearward as a result of vibration or the like during operation.

1-5-12. Retracted Position Locking Mechanism

Figure 25:
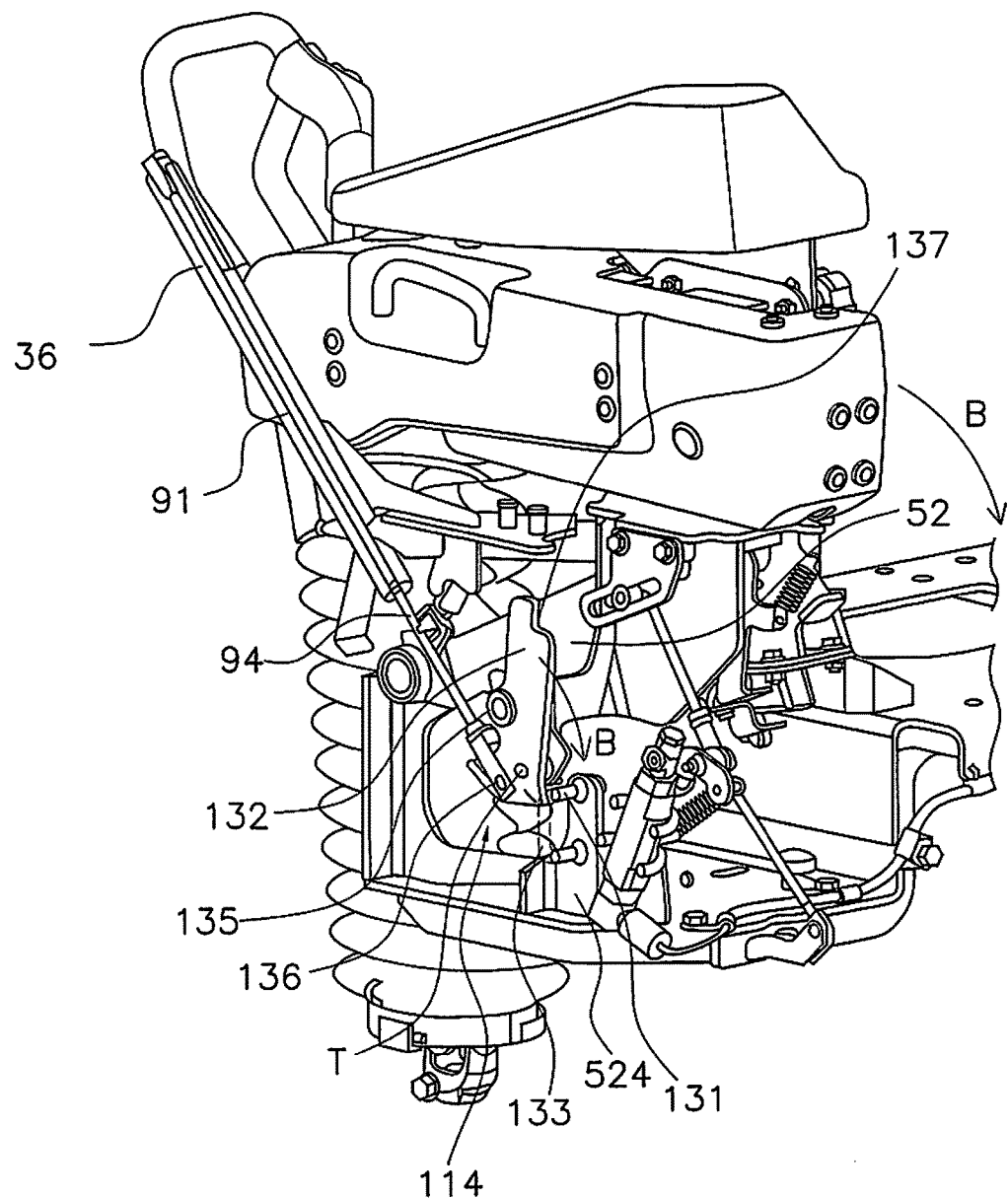
FIG. 25 is a cross sectional oblique view of the retracted position locking mechanism of the console box assembly in FIG. 4.
Figure 26:
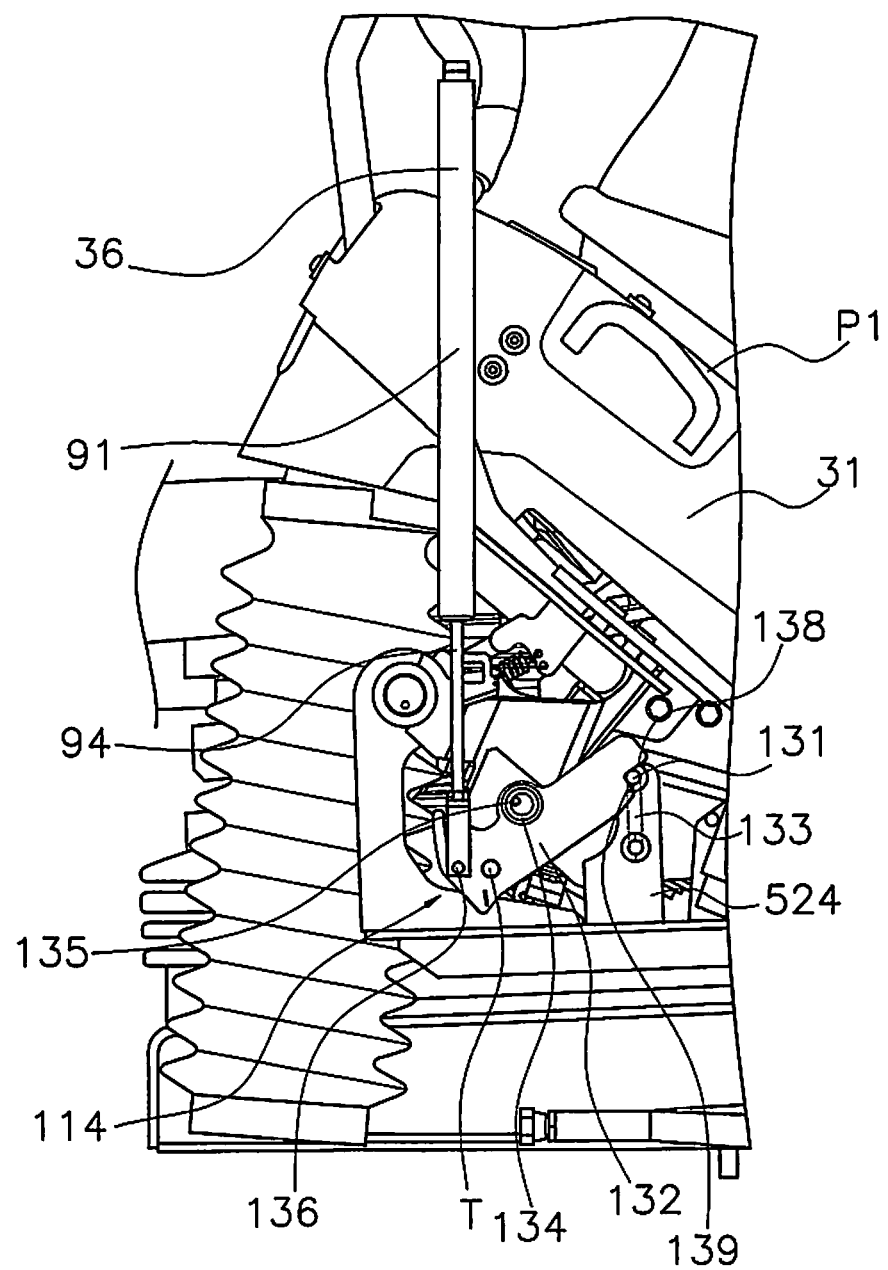
FIG. 26 is a cross sectional oblique view of the retracted position locking mechanism of the console box assembly in FIG. 9.
Figure 27:
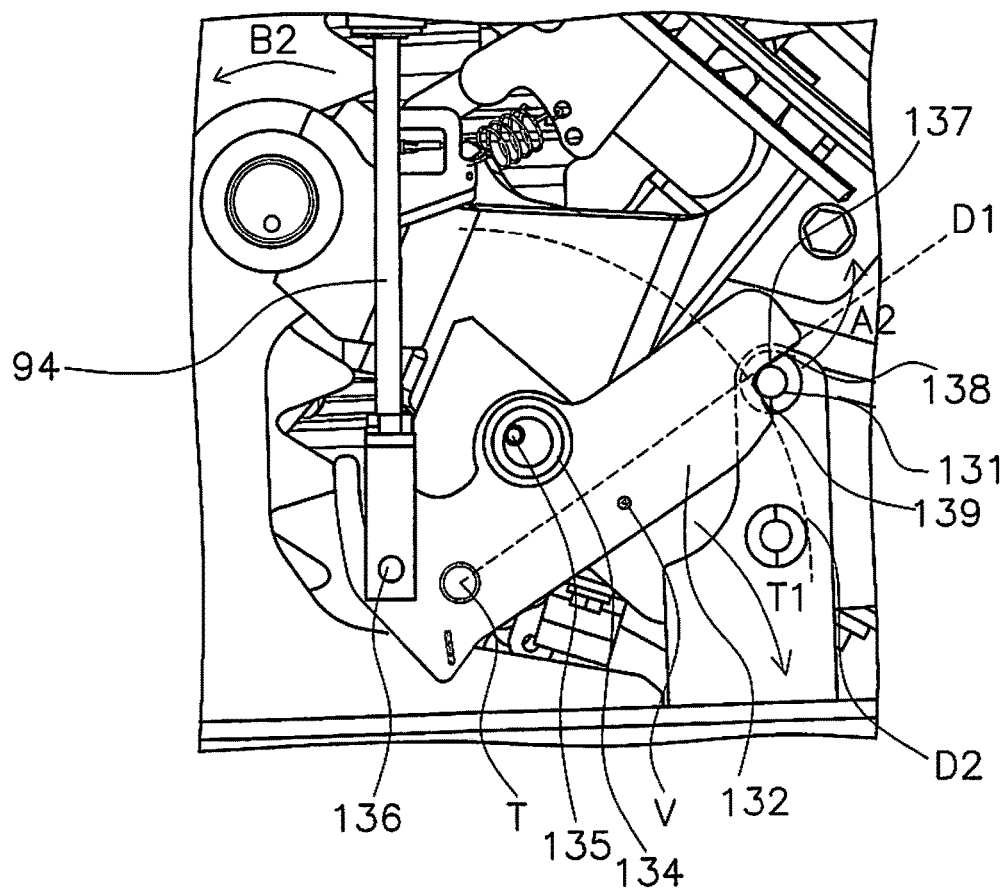
FIG. 27 is a side view of the retracted position locking mechanism in FIG. 25.
Figure 28:
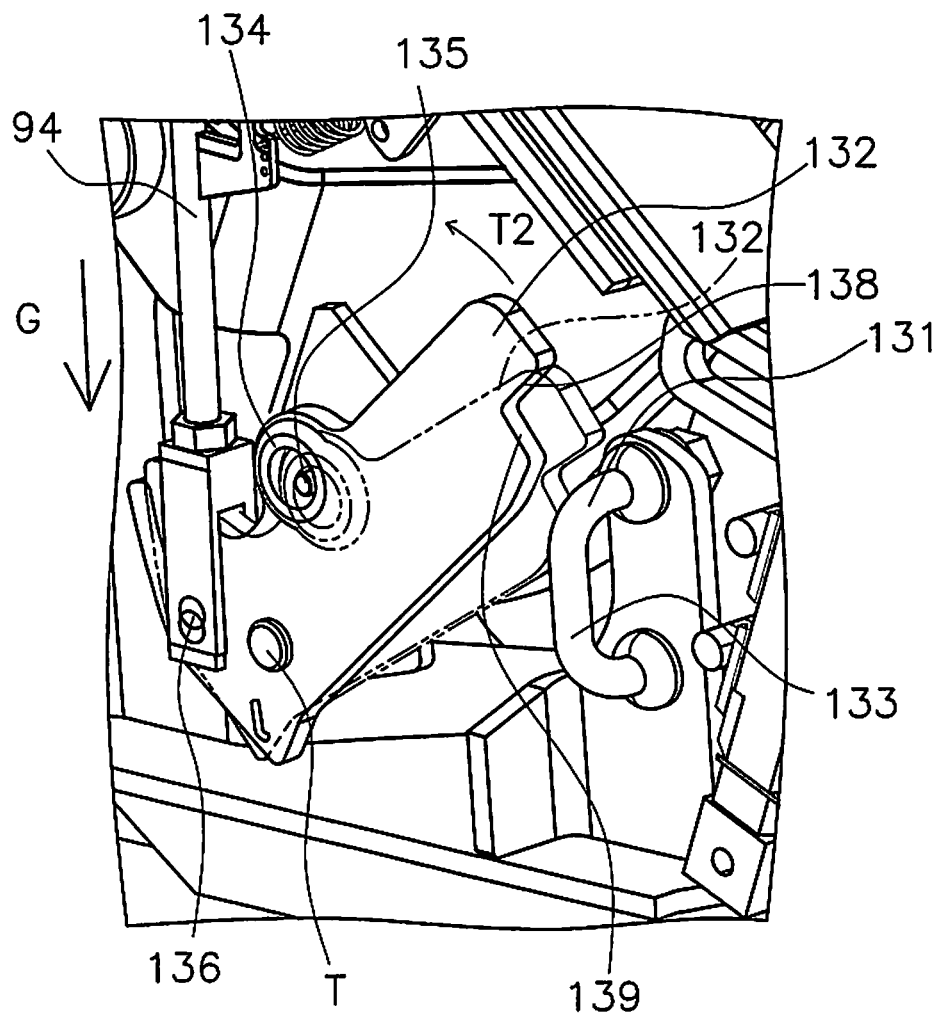
FIG. 28 is an oblique view of the retracted position locking mechanism in FIG. 25.

FIG. 25 is an oblique view of the console box assembly 100 when the console box 31 is disposed in the operation position P1, and shows the state when the left side face 51a of the fixed frame 51 shown in FIG. 15 has been removed. FIG. 26 is a partial side view of the console box assembly 100 when the console box 31 is disposed in the retracted position P2. FIG. 27 shows the area near the operation position locking mechanism 113 in FIG. 26, and FIG. 28 is an oblique view of FIG. 27.

The operation position locking mechanism 113 is provided near the inside of the left side face 623 of the fixed component 62, although the left side face 623 is not depicted in FIG. 25.

The operation position locking mechanism 113 has a striker 131 and a lock plate 132. As shown in FIG. 25, the striker 131 is fixed to the fixed frame 51. More precisely, a bracket 524 is formed facing upward from the bottom face 622, and a handle-shaped member 133 (see FIG. 28) is fixed on the left side face side of the bracket 524. The upper portion formed in the left and right direction of this handle-shaped member 133 (see FIG. 15) constitutes the striker 131. In FIG. 25, part of the handle-shaped member 133 is indicated with a dotted line for the sake of illustration.

As shown in FIGS. 25 and 26, the lock plate 132 is rotatably supported around a rotary shaft T on the left side face of the second rotary part 66 of the rotary frame 52. When the console box 31 is disposed in the retracted position P2 (as shown in FIG. 26), the lock plate 132 is rotatably linked to the lower end of the insertion member 94 at a linked part 136 on the front side of the rotary shaft T. In the state shown in FIG. 26, a through-hole is formed above and to the rear of the rotary shaft T of the lock plate 132, and a grommet 134 is provided. A pin 135 is provided to the rotary frame 52 so as to be disposed inside this grommet 134. In a state in which the console box 31 is disposed in the operation position P1 (as shown in FIG. 25), the grommet 134 is disposed above and ahead of the rotary shaft T.

As shown in FIG. 27, the lock plate 132 has a first striking face 138 and a second striking face 139 where locking is performed in the retracted position by hitting the striker 131. The first striking face 138 and the second striking face 139 are constituted by the edges of a cutout 137 formed approximately on the opposite side of the linked part 136, flanking the rotary shaft T of the lock plate 132. This cutout 137 is formed in the lower end portion to the rear of the lock plate 132. More precisely, the first striking face 138 is formed along a radius D1 whose center is the rotary shaft T. The second striking face 139 is formed along a circumference D2 whose center is the rotary shaft T.

A torsion spring is provided to the rotary shaft T of the lock plate 132, and the cutout 137 is biased so as to face in the arrow T1 direction.

When the rotary lever 36 is rotated rearward from a state in which the console box 31 is disposed in the operation position P1, and the console box 31 is rotated to the retracted position P2, the second contact component 521 hits the second contacted component 511 and the console box 31 comes to a stop, as shown in FIG. 18. In this rotation, the lock plate 132 shown in FIG. 25 also rotates rearward along with the rotary frame 52 (see the arrow T1). As shown in FIG. 26, the first striking face 138 of the lock plate 132 then hits the striker 131.

The center of gravity V of the lock plate 132 is located between the rotary shaft T and the cutout 137. Accordingly, the lock plate 132 is such that the cutout 137 rotates downward, but the pin 135 hits the edge of the grommet 134, which stops the rotation of the lock plate 132. Specifically, even in a state in which the first striking face 138 is not in contact with the striker 131, the rotation of the lock plate 132 will be stopped by the pin 135.

FIGS. 26 and 27 show a locked state in the retracted position. In this state, even if an attempt is made to rotate the rotary lever 36 forward (the arrow B2 direction) so that the console box 31 is rotated forward (the arrow A2 direction), the second striking face 139 will hit the striker 131 and prevent this rotation.

Unlocking in the retracted position will now be described. When the operator presses the push button 94a, as shown in FIG. 28, the insertion member 94 moves downward and the linked part 136 with the lock plate 132 is pushed downward (see the arrow G). The lock plate 132 then rotates around the rotary shaft T until the pin 135 hits the lower edge of the grommet 134, resulting in an unlocked state (see the arrow T2). In FIG. 28, the lock plate 132 is depicted by solid lines in its unlocked state, and by two-dot chain lines in its locked state.

This rotation of the lock plate 132 moves the second striking face 139 forward away from the striker 131, so the second striking face 139 does not interfere with the striker 131 during forward rotation, and the console box 31 can be rotated forward.

Thus, the locking provided by the retracted position locking mechanism 114 is released by pressing the push button 94a.

2. Rotary Operation

The rotary operation of the console box 31 of the wheel loader 1 in an exemplary embodiment pertaining to the present invention is discussed above to describe the various components, and these will be discussed collectively below.

2-1. Rotary Operation from Operation Position to Retracted Position

When the operator rotates the rotary lever 36 rearward (the arrow B1 direction) from a state in which the console box 31 is disposed in the operation position P1 as shown in FIG. 4, the operation position locking mechanism 113 shown in FIG. 19 is released.

More precisely, as shown in FIG. 19, the rotary lever 36 rotates rearward (the arrow B1 direction) around the rotary shaft B with respect to the rotary frame 52, the locking release lever 123 shown in FIG. 23 rotates (arrow R1), the biasing to the pawl member 122 provided by the locking release lever 123 is released, and the locking is released.

After the operation position locking mechanism 113 has been unlocked, when the rotary lever 36 is further rotated rearward (the arrow B1 direction), as shown in FIG. 16, the contact component 92 of the rotary lever 36 hits the contacted part 671 of the rotary frame 52. When the rotary lever 36 is further rotated rearward from this state, the console box 31 rotates in the arrow A1 direction.

When the rotary lever 36 is further rotated, the center of gravity H of the console box 31 (see FIGS. 13 and 14) goes past the vertical line J, and the console box 31 rotates rearward under its own weight and is stopped in the retracted position P2 by the retracted position stopper 112. Also, as the console box 31 rotates, as shown in FIGS. 25 and 26, the lock plate 132 also rotates, and the first striking face 138 of the lock plate 132 hits the striker 131. Consequently, the console box 31 is locked by the retracted position locking mechanism 114 in a state of being disposed in the retracted position P2.

2-2. Rotary Operation from Retracted Position to Operation Position

When the operator rotates the rotary lever 36 forward (the arrow B2 direction) from a state in which the console box 31 is disposed in the retracted position P2 as shown in FIG. 9, the push button 94a is pressed by the operator. As shown in FIG. 28, the pressing of the push button 94a causes the lock plate 132 to rotate forward (the arrow T2 direction) around the shaft T, and the second striking face 139 moves away from the lower side of the striker 131. Consequently, the locking provided by the retracted position locking mechanism 114 is released. In this state, the rotary lever 36 can be rotated forward.

Then, if the rotary lever 36 is rotated forward and the center of gravity H of the console box 31 (see FIGS. 13A-13C and 14A-14C) goes past the vertical line J, the console box 31 begins to rotate forward under its own weight.

When the console box 31 rotates forward under its own weight, the console box 31 is stopped in the operation position P1 by the operation position stopper 111. At this point, the pawl member 122 is rotated forward (the arrow S2 direction) by the striker 121 of the operation position locking mechanism 113 (see FIG. 24). Since the locking release lever 123 is biased forward (the arrow R2 direction), as shown in FIG. 21, the protrusion 123b of the locking release lever 123 fits into the concave component 122b of the pawl member 122, resulting in a state of being locked by the operation position locking mechanism 113.

As shown in FIGS. 4 and 9, the wheel loader 1 (an example of a work vehicle) in this exemplary embodiment comprises the console box 31 and the support component 35. The console box 31 is disposed to the side of the operator's seat 30 and is able to rotate in the forward and backward direction. The support component 35 has a rotary shaft A (an example of a first rotary shaft) disposed in the left and right direction under the console box 31, and supports the console box 31 rotatably around the rotary shaft A, between the horizontally disposed operation position P1 and the retracted position P2 that is disposed at an angle and at a location that is rotated rearward from the operation position P1. The center of gravity H position of the console box 31 is disposed to the front of the rotary shaft A in the operation position P1, and to the rear of the rotary shaft A in the retracted position P2.

Consequently, in a state in which the console box 31 is disposed in the operation position P1, for example, even when the operator should unintentionally touch the rotary lever 36 that rotates the console box 31, so that the console box 31 rotates rearward, the console box 31 will return to the operation position P1 as soon as the operator lets go of the rotary lever 36 (when no force is exerted on the console box 31), until the center of gravity H moves to the rear of the rotary shaft A. Also, in a state in which the console box 31 is disposed in the retracted position P2, even if the operator should unintentionally touch the rotary lever 36 that rotates the console box 31, so that the console box 31 rotates forward, the console box 31 will return to the retracted position P2 as soon as the operator lets go of the rotary lever 36 (when no force is exerted on the console box 31), until the center of gravity H moves in front of the rotary shaft A.

Also, even when vibration produced by the wheel loader 1 should cause the console box 31 disposed in the operation position P1 to vibrate up and down, the console box 31 will return to the operation position P1 under its own weight.

Accordingly, the console box 31 can be stably disposed in the operation position P1 or the retracted position P2.

As shown in FIGS. 13A-13C and 14A-14C, with the wheel loader 1 (an example of a work vehicle) in this exemplary embodiment, the console box 31 is configured to be able to slide in the forward and backward direction with respect to the support component 35. The center of gravity H of the console box 31 is disposed more to the front than the rotary shaft A (an example of a first rotary shaft) in the operation position P1 in a state in which the console box 31 has slid rearward, and is disposed more to the rear than the rotary shaft A in the retracted position P2 in a state in which the console box 31 has slid forward.

Consequently, even though the console box 31 is configured to be able to slide in the forward and backward direction, the console box 31 can be stably disposed in the operation position P1 or the retracted position P2.

As shown in FIGS. 16 and 17, the wheel loader 1 (an example of a work vehicle) in this exemplary embodiment further comprises the gas spring 110 (an example of a biasing component). The gas spring 110 is disposed under the console box 31, and biases the console box 31 in the direction of the operation position P1. The rotational moment produced at the console box 31 by the biasing force of the gas spring 110 in the retracted position P2 is less than the rotational moment produced by the weight of the console box 31.

Consequently, the console box 31 can be stably disposed in the operation position P1 by the biasing force produced by the gas spring 110. Also, in the retracted position P2, the force at which the console box 31 is biased to the operation position P1 is decreased, and the console box can be disposed stably in the retracted position P2 under its own weight.

Thus, providing the gas spring 110 makes it possible to adjust the switching position between the position where the console box 31 returns to the operation position P1 and the position where the console box 31 returns to the retracted position P2, in a state in which the operator is exerting no force.

For example, the biasing force produced by the gas spring 110 can be increased so that the console box 31 will return to the operation position P1 even at a position where the center of gravity H is more to the rear than the rotary shall A.

As shown in FIGS. 16 and 17, the wheel loader 1 (an example of a work vehicle) in this exemplary embodiment further comprises the gas spring 110 (an example of a biasing component). The gas spring 110 is disposed under the console box 31, and biases the console box 31 in the direction of the operation position P1. The gas spring 110 biases in the direction of extension along its lengthwise direction. The support component 35 has the rotary frame 52 and the fixed frame 51. The rotary frame 52 is disposed on the lower side of the console box 31, and rotates along with the console box 31. The fixed frame 51 is disposed on the lower side of the rotary frame 52, and rotatably supports the rotary frame 52. The gas spring 110 has the upper end 110a (an example of a first end) that links to the rotary frame 52 to the rear of the rotary shaft A, and the lower end 110b (an example of a second end) that links to the fixed frame 51 to the rear of the upper end 110a.

Consequently, the console box 31 can be disposed more stably in the operation position P1 by the biasing force produced by the gas spring 110. Also, in the retracted position P2, the force at which the console box 31 is biased to the operation position P1 can be decreased, and the console box 31 can be stably disposed in the retracted position P2 under its own weight.

Thus, providing the gas spring 110 makes it possible to adjust the switching position between the position where the console box 31 returns to the operation position P1 and the position where the console box 31 returns to the retracted position P2, in a state in which the operator is exerting no force, at the rotational position of the console box 31.

Also, even though the console box 31 is configured to be able to slide, the biasing of the console box 31 by the gas spring 110 can be carried out stably by linking the gas spring 110 to the rotary frame 52, which does not slide.

As shown in FIG. 19, the wheel loader 1 (an example of a work vehicle) in this exemplary embodiment further comprises the operation position locking mechanism 113 that releasably locks the console box 31 in the operation position P1.

This allows the console box 31 to be fixed in the operation position P1, and improves stability. Also, even when the console box 31 should become unlocked by vibration or by accidental operation, since the center of gravity H of the console box 31 is disposed more to the front than the rotary shaft A, the console box 31 can return to the operation position P1 under its own weight, affording double the stability.

As shown in FIG. 21, the wheel loader 1 (an example of a work vehicle) in this exemplary embodiment further comprises the rotary lever 36, which is grasped by the operator when rotating the console box 31 in the forward and backward direction. The support component 35 has the rotary frame 52 and the fixed frame 51. The rotary frame 52 is disposed on the lower side of the console box 31 and rotates along with the console box 31. The fixed frame 51 is disposed on the lower side of the rotary frame 52 and rotatably supports the rotary frame 52. The rotary lever 36 is rotatably attached to the rotary frame 52 at the rotary shaft B (an example of a second rotary shaft) provided at a different position from that of the rotary shaft A (an example of a first rotary shaft). The operation position locking mechanism 113 has the striker 121 (an example of a first latching member) and the pawl member 122 (an example of a locking component). The striker 121 is disposed on the fixed frame 51. The pawl member 122 is disposed on the rotary frame 52, and is latched to the striker 121 in a locked state at the operation position P1. The latching of the pawl member 122 to the striker 121 is released as the rotary lever 36 rotates rearward.

Consequently, locking can be released at the operation position P1 along with the operation to rotate the console box 31 in the forward and backward direction.

As shown in FIGS. 5 and 16, with the wheel loader 1 (an example of a work vehicle) in this exemplary embodiment, the rotary frame 52 has the contacted part 671 that the rotary lever 36 hits when the rotary frame 52 has rotated rearward by a specific angle after the latching is released. The rotary frame 52 rotates rearward along with the rotary lever 36 after the rotary lever 36 hits the contacted part 671.

Consequently, play of a specific angle can be provided to the operation of the rotary lever 36 by the time the console box 31 rotates after the locking is released in the operation position P1. This play keeps the rotation of the console box 31 from starting simultaneously with unlocking, affording better stability.

As shown in FIG. 25, the wheel loader 1 (an example of a work vehicle) in this exemplary embodiment further comprises the retracted position locking mechanism 114 that releasably locks the console box 31 in the retracted position P2.

Consequently, the console box 31 can be fixed in the retracted position P2, affording better stability. Also, even when the console box 31 should become unfixed due to vibration or unintentional operation, since the center of gravity of the console box 31 is to the rear of the rotary shaft A, the console box 31 can return to the retracted position P2 under its own weight, thus affording double the stability.

As shown in FIG. 26, the wheel loader 1 (an example of a work vehicle) in this exemplary embodiment further comprises the rotary lever 36 that is grasped by the operator when the console box 31 is rotated in the forward and backward direction. The support component 35 has the rotary frame 52 and the fixed frame 51. The rotary frame 52 is disposed on the lower side of the console box 31, and rotates along with the console box 31. The fixed frame 51 is disposed on the lower side of the rotary frame 52, and rotatably supports the rotary frame 52. The rotary lever 36 is attached to the rotary frame 52. The retracted position locking mechanism 114 has the striker 131 (an example of a restricting member) and the lock plate 132 (an example of a locking member). The striker 131 is disposed on the fixed frame 51. The lock plate 132 is rotatably disposed on the rotary frame 52, and its forward rotation is restricted by the striker 131 in a state of being locked in the retracted position P2. The rotary lever 36 has the cylindrical grip 91 that is grasped by the operator, and the post-shaped insertion member 94 that is inserted into the grip 91. The insertion member 94 has the push button 94a that is formed at one end and protrudes from the distal end of the grip 91, and the other end is linked to the lock plate 132 at the linked part 136. The lock plate 132 is rotated by pressing the push button 94a, which releases the restriction produced by the striker 131.

Consequently, the operator can perform unlocking by grasping the rotary lever 36 in the retracted position P2 and pressing the push button 94a. The grasped rotary lever 36 can then be rotated forward to move the console box 31 from the retracted position P2 to the operation position P1.

As shown in FIG. 27, with the wheel loader 1 (an example of a work vehicle) in this exemplary embodiment, the lock plate 132 (an example of a locking member) is formed so as to rotate rearward under its own weight, around the rotary shaft T (an example of a third rotary shaft). The lock plate 132 has the first striking face 138 (an example of a contact face) and the second striking face 139 (an example of an interference face). The first striking face 138 is in contact with the striker 131 (an example of a restricting member) under its own weight in the retracted position P2. The second striking face 139 is formed along a circumference D2 whose center is the rotary shaft T, and is disposed under the striker 131 in a state in which the first striking face 138 is in contact with the striker 131. The second striking face 139 hits and interferes with the striker 131 when the console box 31 has been rotated forward in a state in which the push button 94a is not being pressed. When the push button 94a is pressed, the lock plate 132 rotates forward around the rotary shaft T and the second striking face 139 moves away from under the striker 131.

Consequently, the rotation of the console box 31 can be locked by the weight of the lock plate 132 in the retracted position P2, so stability is excellent.

An exemplary embodiment of the present invention is described above, but the present invention is not limited to or by the above exemplary embodiment, and various modifications are possible without departing from the gist of the invention.

The gas spring 110 is provided in the above exemplary embodiment, but the gas spring 110 need not be provided. Here again, as shown in FIGS. 13A-C and 14A-C, the center of gravity H of the console box 31 is disposed more to the front than the rotary shaft A in the operation position P1, and more to the rear than the rotary shaft A in the retracted position P2, so the console box 31 can be stably disposed in the operation position P1 and the retracted position P2.

In the above exemplary embodiment, it is stated that the lock plate 132 is biased rearward (see the arrow T1) by s torsion spring provided to the rotary shaft T, but a torsion spring need not be provided. Here again, since the center of gravity V of the lock plate 132 is provided to the rear of the rotary shaft T, rearward rotation (the arrow T1 direction) under its own weight as shown in FIG. 26 allows locking in the retracted position P2.

Consequently, even when the torsion spring should stop functioning due to age, etc., when the console box 31 is rotated rearward, the console box 31 can be locked, affording good stability.

With the wheel loader 1 in the above exemplary embodiment, the joystick 32 of the console box 31 is given as an example of an operation member, but this is not limited to being the joystick 32. Furthermore, an operation member itself need not be provided, and the configuration of this embodiment can be applied so long as the console box 31 is provided to the side of the operator's seat 30.

With the wheel loader 1 in the above exemplary embodiment, the link 33 is provided, and the operation of the joystick 32 is transmitted mechanically to the pilot valve 19, but the configuration may be such that no link 33 is provided, and the operation is transmitted electrically. In this case, the transmission may be done by wire or wirelessly.

With the wheel loader 1 in the above exemplary embodiment, the pilot valve 19 is provided as an example of a control valve, but this is not limited to the pilot valve 19. For example, the pilot valve 19 may not be provided, the link 33 may be connected to the steering valve 20 (an example of a control valve), and the steering valve 20 may be operated directly with the joystick 32.

In the above exemplary embodiment, the armrest 34 is provided on the upper side of the console box 31, but the armrest 34 need not be provided. Also, as shown in FIGS. 9 and 10, the rear end of the armrest 34 protrudes rearward from the rear end 31b of the console box 31, but the armrest 34 may be formed so that there is no protrusion.

In the above exemplary embodiment, a wheel loader is used as an example of a work vehicle, but this may instead be a dump truck, a hydraulic excavator, or the like.

In the above exemplary embodiment, the steering wheel 37 is disposed in the cab 5, but depending on the work vehicle, the steering wheel 37 is sometimes not provided.

The above exemplary embodiment and other exemplary embodiments also encompass the following inventions.

The work vehicle of the present invention comprises a console box, a support component, and an operation position locking mechanism. The console box is disposed to the side of an operator's seat, and is able to rotate in the forward and backward direction. The support component has a first rotary shaft disposed along the left and right direction and under the console box, and rotatably supports the console box around the first rotary shaft between an operation position in which the console box is disposed horizontally and a retracted position in which the console box is rotated rearward from the operation position and that is disposed at an angle. The operation position locking mechanism releasably locks the console box in the operation position.

The work vehicle of the present invention comprises a console box, a support component, and a retracted position locking mechanism. The console box is disposed to the side of an operator's seat, and is able to rotate in the forward and backward direction. The support component has a first rotary shaft disposed along the left and right direction and under the console box, and rotatably supports the console box around the first rotary shaft between an operation position in which the console box is disposed horizontally and a retracted position in which the console box is rotated rearward from the operation position and that is disposed at an angle. The retracted position locking mechanism releasably locks the console box in the retracted position.

The work vehicle pertaining to the present invention has the effect of improving the stability of a console box in a position to which it has moved in the forward and backward direction, and can be widely applied to various kinds of work vehicle, such as a wheel loader.

The invention claimed is:

1. A work vehicle, comprising:
   a console box disposed on a side of an operator's seat, the console box being rotatable in a forward and backward direction; and
   a support component having a first rotary shaft disposed in a left and right direction below the console box, the support component supporting the console box rotatably around the first rotary shaft between an operation position and a retracted position in which the console box is rotated from the operation position,
   a center of gravity position of the console box being disposed more to a front than the first rotary shaft in the operation position, and more to a rear than the first rotary shaft in the retracted position.

2. The work vehicle according to claim 1, wherein
   the console box is configured to be slidable in the forward and backward direction with respect to the support component, and
   the center of gravity position of the console box is disposed more to the front than the first rotary shaft in the operation position in a state in which the console box has been slid to the rear, and more to the rear than the first rotary shaft in the retracted position in a state in which the console box has been slid forward.

3. The work vehicle according to claim 1, further comprising
   a biasing component disposed below the console box to bias the console box in a direction of the operation position,
   a rotational moment produced in the console box by a biasing force of the biasing component in the retracted position being less than a rotational moment produced by a weight of the console box.

4. The work vehicle according to claim 1, further comprising
   a biasing component disposed below the console box to bias the console box in a direction of the operation position,
   the biasing component biasing in a direction of expansion in its lengthwise direction,
   the support component including
   a rotary frame disposed below the console box, the rotary frame rotating along with the console box; and
   a fixed frame disposed below the rotary frame, the fixed frame rotatably supporting the rotary frame, and
   the biasing component having a first end that links to the rotary frame to the rear of the first rotary shaft, and a second end that links to the fixed frame to the rear of the first end.

5. The work vehicle according to claim 1, further comprising
   an operation position locking mechanism releasably locking the console box in the operation position.

6. The work vehicle according to claim 5, further comprising
   a rotary lever configured to be grasped by an operator when the console box is rotated in the forward and backward direction,
   the support component including
   a rotary frame disposed below the console box, the rotary frame rotating along with the console box; and
   a fixed frame disposed below the rotary frame, the fixed frame rotatably supporting the rotary frame;
   the rotary lever being rotatably attached to the rotary frame around a second rotary shaft provided at a different position from a position of the first rotary shaft,
   the operation position locking mechanism including
   a latching member disposed on the fixed frame; and
   a locking component disposed on the rotary frame, the locking component being latched by the latching member in a locked state at the operation position, and
   a latching of the locking component to the latching member being released as the rotary lever rotates rearward.

7. The work vehicle according to claim 6, wherein
   the rotary frame has a contacted part that is hit by the rotary lever when the rotary lever rotates rearward by a specific angle after the latching is released, and
   the rotary frame rotating rearward along with the rotary lever after the rotary lever hits the contacted part.

8. The work vehicle according to claim 1, further comprising
   a retracted position locking mechanism releasably locking the console box in the retracted position.

9. The work vehicle according to claim 8, further comprising
   a rotary lever configured to be grasped by an operator when the console box is rotated in the forward and backward direction,
   the support component including
   a rotary frame disposed below the console box, the rotary frame rotating along with the console box; and a fixed frame disposed below the rotary frame, the fixed frame rotatably supporting the rotary frame;

the rotary lever being rotatably attached to the rotary frame, the retracted position locking mechanism including a restricting member disposed on the fixed frame; and a locking member disposed rotatably on the rotary frame, a forward rotation of the locking member being restricted by the restricting member in the state of being locked at the retracted position, the rotary lever having a cylindrical grip configured to be grasped by an operator, and a post-shaped insertion member inserted into the grip, the insertion member having a push button formed at one end and protruding from a distal end of the grip, and the other end being linked to the locking member at a linked part, and the locking member being rotated by depressing the push button, thereby releasing a restriction by the restricting member.

10. The work vehicle according to claim 9, wherein the locking member is formed so as to rotate rearward under its own weight and around a third rotary shaft, and includes a contact face configured to come into contact with the restricting member under its own weight at the retracted position; and an interference face formed in an arc whose center is the third rotary shaft, the interference face being disposed under the restricting member in a state in which the contact face is in contact with the restricting member, the interference face interfering with the restricting member when the console box has been rotated forward in a state in which the push button is not being depressed, and the locking member rotating forward around the third rotary shaft and the interference face moving away from under the restricting member when the push button is depressed.

11. The work vehicle according to claim 1, wherein the console box is horizontally disposed when the console box is in the operation position, and the console box is rotated rearward to be inclined when the console box is in the retracted position.

* * * * *